US006765340B2

(12) United States Patent
Nishikawa et al.

(10) Patent No.: US 6,765,340 B2
(45) **Date of Patent: *Jul. 20, 2004**

(54) SPARK PLUG

(75) Inventors: Kenichi Nishikawa, Bisai (JP); Makoto Sugimoto, Nagoya (JP)

(73) Assignee: NGK Spark Plug Co., Ltd., Nagoya (JP)

(*) Notice: Subject to any disclaimer, the term of this patent is extended or adjusted under 35 U.S.C. 154(b) by 24 days.

This patent is subject to a terminal disclaimer.

(21) Appl. No.: 10/178,786

(22) Filed: Jun. 25, 2002

(65) Prior Publication Data

US 2003/0122462 A1 Jul. 3, 2003

(30) Foreign Application Priority Data

Jun. 26, 2001 (JP) ....................................... 2001-192611

(51) Int. Cl.[7] ............................ H01T 13/20; C03C 8/00

(52) U.S. Cl. ....................... 313/143; 313/118; 313/130; 252/519.5; 501/14

(58) Field of Search ................................. 313/118, 143, 313/130; 501/14–17, 152, 154; 252/519.5

(56) References Cited

U.S. PATENT DOCUMENTS

| | | | | |
|---|---|---|---|---|
| 4,084,976 A | | 4/1978 | Hinton | |
| 4,120,733 A | | 10/1978 | Knapp | |
| 4,256,497 A | | 3/1981 | Knapp | |
| 5,677,250 A | | 10/1997 | Knapp | |
| 6,274,971 B1 | | 8/2001 | Sugimoto et al. | |
| 6,492,289 B1 | * | 12/2002 | Suzuki et al. | 501/14 |
| 6,566,792 B2 | * | 5/2003 | Nishikawa | 313/118 |
| 6,590,317 B2 | * | 7/2003 | Nishikawa et al. | 313/118 |
| 6,590,318 B2 | * | 7/2003 | Nishikawa et al. | 313/143 |

FOREIGN PATENT DOCUMENTS

| | | |
|---|---|---|
| JP | 10-236845 | 9/1998 |
| JP | 11-043351 | 2/1999 |
| JP | 11-106234 | 4/1999 |
| JP | 2000-48931 | 2/2000 |
| JP | 2000-313681 | 11/2000 |
| JP | 2001-39733 | 2/2001 |
| JP | 2001-56949 | 2/2002 |
| JP | 2002-117955 | 4/2002 |

OTHER PUBLICATIONS

JIS B0601 with English translation.

* cited by examiner

*Primary Examiner*—Vip Patel
*Assistant Examiner*—German Colón
(74) *Attorney, Agent, or Firm*—Morgan, Lewis & Bockius LLP

(57) ABSTRACT

A spark plug comprising: a center electrode;

a metal shell; and an alumina ceramic insulator disposed between the center electrode and the metal shell, wherein at least part of the surface of the insulator is covered with a glaze layer comprising oxides, the glaze layer comprising: 1 mol % or less of a Pb component in terms of PbO; 40 to 60 mol % of a Si component in terms of $SiO_2$; 20 to 40 mol % of a B component in terms of $B_2O_3$; 0.5 to 25 mol % of a Zn component in terms of ZnO; 0.5 to 15 mol % in total of at least one of Ba and Sr components in terms of BaO and SrO, respectively; 2 to 12 mol % in total of at least one alkaline metal component of Na, K and Li, in terms of $Na_2O$, $K_2O$, and $Li_2O$, respectively, wherein K is essential; and 0.1 to 5 mol % in total of at least one component of Bi, Sb and rare earth RE, RE being at least one selected from Sc, Y, La, Ce, Pr, Nd, Sm, Eu, Gd, Tb, Dy, Ho, Er, Tm, Yb and Lu, in terms of $Bi_2O_3$, $Sb_2O_5$ and $RE_2O_3$, respectively, proviso that Ce is in terms of $CeO_2$ and Pr is in terms of $Pr_7O_{11}$, wherein the glaze layer comprises 8 to 30 mol % in total of the Zn component and the at least one of Ba and Sr components in terms of ZnO, BaO and SrO, respectively.

15 Claims, 3 Drawing Sheets

SPARK PLUG

FIELD OF THE INVENTION

This invention relates to a spark plug.

BACKGROUND OF THE INVENTION

A spark plug used for ignition of an internal engine of such as automobiles generally comprises a metal shell to which a ground electrode is fixed, an insulator made of alumina ceramics, and a center electrode which is disposed inside the insulator. The insulator projects from the rear opening of the metal shell in the axial direction. A terminal metal fixture is inserted into the projection part of the insulator and is connected to the center electrode via a conductive glass seal layer which is formed by a glass sealing procedure or a resistor. A high voltage is applied to the terminal metal fixture to cause a spark over the gap between the ground electrode and the center electrode.

Under some combined conditions, for example, at an increased spark plug temperature and an increased environmental humidity, it may happen that high voltage application fails to cause a spark over the gap but, instead, a discharged called as a flashover occurs between the terminal metal fixture and the metal shell, going around the projecting insulator. Primarily for the purpose of avoiding flashover, most of commonly used spark plugs have a glaze layer on the surface of the insulator. The glaze layer also serves to smoothen the insulator surface thereby preventing contamination and to enhance the chemical or mechanical strength of the insulator.

In the case of the alumina insulator for the spark plug, such a glaze of lead silicate glass has conventionally been used where silicate glass is mixed with a relatively large amount of PbO to lower a dilatometric softening point. In recent years, however, with a globally increasing concern about environmental conservation, glazes containing Pb have been losing acceptance. In the automobile industry, for instance, where spark plugs find a huge demand, it has been a subject of study to phase out Pb glazes in a future, taking into consideration the adverse influences of wasted spark plugs on the environment.

Leadless borosilicate glass- or alkaline borosilicate glass-based glazes have been studied as substitutes for the conventional Pb glazes, but they inevitably have inconveniences such as a high glass viscosity or an insufficient insulation resistance. In particular, in the case of the glaze for spark plugs, since being served together with engines, it more easily increases temperature than ordinary insulating porcelains (maximum: around 200° C.), and recently being accompanies with high performance of engines, voltage to be supplied to the spark plug has been high, and the glaze has been demanded to have the insulating performance durable against more severer. Actually, for restraining the flashover under a condition of increasing temperature, such a glaze is necessary which is more excellent in the insulating property under the condition of increasing temperature.

SUMMARY OF THE INVENTION

In the existing leadless glaze for spark plugs, for checking a melting point from going up effected by removing a lead component, an alkaline metal component has been mixed. The alkaline metal component is effective for securing fluidity when baking the glaze. However, the more the content of the alkaline metal component, the lower the insulating resistance of the glaze, and an anti-flashover property is easily spoiled. Therefore, the alkaline metal component in the glaze should be limited to a necessary minimum for increasing the insulating property.

So, the existing leadless glaze has inevitably wanted the content of the alkaline metal, a vitreous viscosity is easy to increase at high temperature (when melting the glaze) in comparison with a Pb-glaze, and after baking the glaze, there easily appear pinholes or glaze crimping.

It is an object of the invention to offer such a spark plug which contains a smaller Pb component, is excellent in the fluidity when baking the glaze, high in the insulating resistance, and good in the anti-flashover.

The spark plug according to the invention has a structure having an alumina ceramic insulator disposed between a center electrode and a metal shell, wherein at least part of the surface of the insulator is covered with a glaze layer of oxide being a main.

The glaze layer comprises

Pb component 1 mol % or less in terms of PbO;

Si component 40 to 60 mol % in terms of $SiO_2$;

B component 20 to 40 mol % in terms of $B_2O_3$;

Zn component 0.5 to 25 mol % in terms of ZnO;

Ba and/or Sr components 0.5 to 15 mol % in terms of BaO or SrO in total;

the glaze layer comprises Zn component and Ba and/or Sr components 8 to 30 mol % in total in terms of ZnO, BaO or SrO, respectively, alkaline metal components of 2 to 12 mol % in total of one kind or more of Na in terms $Na_2O$, K in terms of $K_2O$ and Li in terms of $Li_2O$, K being essential, respectively; and one kind or more (hereinafter referred to as "necessary fluidity improving components) selected from Bi, Sb and rare earth elements RE (selected from a group of Sc, Y, La, Ce, Pr, Nd, Sm, Eu, Gd, Th, Dy, Ho, Er, Tm, Yb and Lu) of 0.1 to 5 mol % in total of Bi in terms of $Bi_2O_3$, Sb in terms of $Sb_2O_5$, as to RE, Ce in terms of $CeO_2$, Pr in terms of $Pr_7O_{11}$, and others in terms of $RE_2O_3$.

In the spark plug according to the invention, for aiming at the adaptability to the environmental problems, it is a premise that the glaze to be used contains the Pb component 1.0 mol % or less in terms of PbO (hereafter called the glaze containing the Pb component reduced to this level as "leadless glaze"). When the Pb component is present in the glaze layer in the form of an ion of lower valency (e.g., $Pb^{2+}$), it is oxidized to an ion of higher valency (e.g., $Pb^{3+}$) by a corona discharge. If this happens, the insulating properties of the glaze layer are reduced, which probably spoils an anti-flashover. From this viewpoint, too, the limited Pb content as mentioned above is beneficial. A preferred Pb content is 0.1 mol % or less. It is most preferred for the glaze to contain substantially no Pb (except a trace amount of lead unavoidably incorporated from raw materials of the glaze).

While lowering the Pb content as mentioned above, the invention selects the above mentioned particular compositions for providing the insulating performance, optimizing the glaze baking temperature and securing a good glaze-baked finish. In the existing glaze, the Pb component plays an important part as to adjustment of the dilatometric softening point (practically, appropriately lowering the dilatometric softening point of the glaze and securing the fluidity when baking the glaze) but in the leadless glaze, the B component ($B_2O_3$) and the alkaline metal have a deep relation with adjustment of the dilatometric softening point. Inventors found that the B component has a particularly convenient range for improving the glaze baking finish in relation with the content of the Si component, and if the necessary fluidity improving component is contained in the above mentioned range, the fluidity when baking the glaze may be secured, and in turn the baking of the glaze is possible at relatively low temperatures, the glaze layer having an excellent and smooth baked surface is available, and they completed this invention.

Each of these necessary fluidity improving components has effects of heightening the fluidity when baking the glaze, controlling the bubble forming in the glaze layer, or wrapping adhered substances to the glaze baked surface to prevent abnormal projections. Sb and Bi are especially remarkable in these effects (Bi has possibility to be designated as a limited substance in a future). The improvement of the fluidity when baking the glaze is more remarkable by combining two kinds or more of these fluidity improving components. Since the rare earth component comparatively takes cost for separation and refinement, use of non-separating rare earth elements (in this case, those are the composition particular to raw ores and a plurality of kinds of rare earth elements are mixed) is advantageous for saving cost. If the total amount in terms of oxides of the indispensable fluidity improving components is less than 0.1 mol %, there will be probably a case of not always providing an effect of improving the fluidity when baking the glaze for easily obtaining a smooth glaze layer. On the other hand, if exceeding 5 mol %, there will be probably a case of being difficult or impossible to bake the glaze owing to too much heightening of the softening point of the glaze.

If parts of Sb, Bi and the rare earth components are more than 5 mol % in the addition amount, the glaze layer might be excessively colored. For example, visible information such as letters, figures or product numbers are printed with color glazes on external appearances of the insulators for specifying producers and others, and if the colors of the glaze layer is too thick, it might be difficult to read out the printed visible information. As another realistic problem, there is a case that tint changing resulted from alternation in the glaze composition is seen to purchasers as "unreasonable alternation in familiar colors in external appearance", so that an inconvenience occurs that products could not always be quickly accepted because of a resistant feeling thereto.

The insulator forming a substrate of the glaze layer is composed of alumina based ceramics in white, and in view of preventing or restraining coloration, it is desirable that the coloration in an observed external appearance of the glaze layer formed in the insulator is adjusted to be 0 to 6 in chroma Cs and 7.5 to 10 in lightness Vs, for example, the amount of the above transition metal component is adjusted. If the chroma exceeds 6, discrimination by naked eye is conspicuous, and if lightness is 7.5 or lower, the gray or blackish coloration is easily distinguished. In either way, there appears a problem that an impression of "apparent coloration" cannot be wiped out. The chroma Cs is desirably 0 to 2, more desirably 0 to 1, and the chroma is preferably 8 to 10, more preferably 9 to 10. In the present specification, a measuring method of the lightness Vs and the chroma Cs adopts the method specified in "4.3 A Measuring Method of Reflected Objects" of "4. Spectral Colorimetry" in the "A Measuring Method of Colors" of JIS-Z8721. As a simple method, the lightness and the chroma can be known through visual comparisons with standard color chart prepared according to JIS-Z8721.

In the following description, detailed explanation will be made to plays of other components.

The alkaline metal component is inherently high in ion conductivity and trends to lower the insulating property in the glaze layer of vitreous substance. On the other hand, the Si component or the B component form a vitreous skeleton, and by appropriately determining the contents, sizes of network of skeleton are made suitable for blocking the ion conductivity of the alkaline metal and securing the desirable insulating property. Since the Si component or the B component are ready for forming skeleton, they trend to lower the fluidity when baking the glaze, but by containing the alkaline metal component of the appropriate amount together with the components of improving fluidity, the fluidity is heightened by lowering melting points by a eutectic reaction and preventing formation of complex anion by mutual action of Si ion and O ion.

The Si component is difficult to secure the sufficient insulating property if being less than 40 mol %, and is difficult to bake the glaze if being more than 60 mol %. On the other hand, if the B component is less than 20 mol %, the dilatometric softening point of the glaze rises and the baking of the glaze is difficult. If the B component exceeds 40 mol %, the crimping is easy to occur in the glaze. Depending on contents of other components, there probably occur problems about devitrification of the glaze layer, decrease of the insulating property or non-compatibility with thermal expansion coefficient.

If the Zn component is less than 0.5 mol %, the thermal expansion coefficient of the glaze layer is too large, defects such as crazing easily occur in the glaze layer. Since the Zn component also acts to lower the dilatometric softening point of the glaze, if it is short, the baking of the glaze will be difficult. Being more than 25 mol %, opacity easily occurs in the glaze layer due to the devitrification. It is good that the Zn containing amount to determine 10 to 20 mol %. When containing the Zn component within this desirable range, the fluidity improving effect can be also expected by lowering of the dilatometric softening point of the Zn component itself, and in this case, the total amount of the fluidity improving components is desirably 0.1 to 2.5 mol %.

The Ba or Sr components contribute to heightening of the insulating property of the glaze layer and is effective to increasing of the strength. If the total amount is less than 0.5 mol %, the insulating property of the glaze layer goes down, and the anti-flashover might be spoiled. Being more than 15 mol %, the thermal expansion coefficient of the glaze layer is too high, defects such as crazing easily occur in the glaze layer. In addition, the opacity easily occurs in the glaze layer. From the viewpoint of heightening the insulating property and adjusting the thermal expansion coefficient, the total amount of Ba and Sr is desirably determined to be 0.5 to 10 mol %. Either or both of the Ba and Sr component may be contained, but the Ba component is advantageously cheaper in a cost of a raw material.

The Ba and Sr components may exist in forms other than oxides in the glaze depending on raw materials to be used. For example, $BaSO_4$ is used as a source of the Ba component, an S component might be residual in the glaze layer. This sulfur component is concentrated nearly to the surface of the glaze layer when baking the glaze to lower the surface expansion of a melted glaze and to heighten a smoothness of a glaze layer to be obtained.

The total amount of the Zn component and Ba and/or Sr components is desirably 8 to 30 mol % in terms of oxide. If the total amount exceeds 30 mol %, the glaze layer will be slightly opaque. For example, on the outer surface of the insulator, visual information such as letters, figures or product numbers are printed and baked with color glazes for identifying makers and others, and owing to the slight opaqueness, the printed visual information is sometimes illegible. Or, if being less than 10 mol %, the dilatometric softening point exceedingly goes up to make the glaze baking difficult and cause bad external appearance. Thus, the total amount is more desirably 10 to 20 mol %.

Next, if the total amount of the alkaline metal components is less than 2 mol %, the dilatometric softening point of the glaze goes up, and the baking of the glaze might be probably impossible. In case of being more than 12 mol %, the insulating property probably goes down, and an anti-flashover might be spoiled. With respect to the alkaline metal components, not depending on one kind, but adding in joint two kinds or more selected from Na, K and Li, the insulating property of the glaze layer is more effectively restrained from lowering. As a result, the amount of the alkaline metal components can be increased without decreasing the insulating property, consequently it is possible to concurrently attain the two purposes of securing the fluidity when baking the glaze and the anti-flashover (so-called alkaline joint addition effect).

Further, as to the alkaline metal components, it is desirable to contain K as the necessary element for securing the fluidity when baking the glaze and heightening the insulating property while heightening smoothness of the glaze layer to be formed. Because it is assumed that since the K component has the large atomic amount in comparison with other alkaline components Na and Li, although containing the same mol amount and has the same cation number, this component largely occupies the weight ratio.

Specifically, it is desirable to set the rate of the K component of the alkaline metal components of Na, K and Li in the mol % in terms of oxide as $$0.4 \leqq K/(Na+K+Li) \leqq 0.8.$$

If the value of K/(Na+K+Li) is less than 0.4, the above mentioned effect by the K addition might be insufficient. On the other hand, that the value of K/(Na+K+Li) is less 0.8 denotes that alkaline metal components other than K are added in joint within a range of a rest being 0.2 or more (0.6 or less), probably goes down, and an anti-flashover might be spoiled. With respect to the alkaline metal components, not depending on one kind, but adding in joint two kinds or more selected from Na, K and Li, the insulating property of the glaze layer is more effectively restrained from lowering. As a result, the amount of the alkaline metal components can be increased without decreasing the insulating property, consequently it is possible to concurrently attain the two purposes of securing the fluidity when baking the glaze and the anti-flashover. Incidentally, it is more desirable to adjust the value of K/(Na+K+Li) to be 0.5 to 0.7.

As the K component has a larger atomic amount than those of Na and Li, in case the total amount of the alkaline metal components is set to be the same mol %, the K component does not exhibit the fluidity improving effect as the Na or Li components, but comparing with Na or Li (particularly, Li), as an ionic migration of K is comparatively small in the glaze layer of the vitreous substance, the K component has an inclination difficult to lower the insulating property of the glaze layer, though increasing the amount. On the other hand, as the Li component has the small atomic amount, the fluidity improving effect is larger than that of the K component, but as the ionic migration is high, an exceeding addition easily brings about reduction of the insulating property of the glaze layer. However, being different from the K component, the Li component has a property reducing the thermal expansion coefficient of the glaze layer.

Among the alkaline metal components, it is possible to effectively restrain the insulating property of the glaze layer from lowering by making the amount of the K component highest, and by mixing the Li component of the amount next to the highest amount of K, it is possible to secure the fluidity when baking the glaze, restrain increase of the thermal expansion coefficient of the glaze layer by mixing the K component, and meet to the thermal expansion coefficient of alumina in a substrate. The inclination of the insulating property decreasing by addition of the Li component can be effectively restrained by the above mentioned joint addition of alkaline metals by the three components by compounding Na of the smaller amount than those of K or Li. As a result, it is possible to realize such a glaze composition which is high in the insulating property, rich in the fluidity when baking the glaze, and small in difference between the thermal expansion coefficients with that of alumina being the insulator composing ceramic.

The Li component is preferred to be contained in order to realize the effect of adding in joint alkaline components for increasing the insulating property, and in order to adjust the heat expansion coefficient of the glaze layer, to secure the fluidity when baking the glaze, and further to increase the mechanical strength. It is preferable that the Li component is contained in the mol amount in terms of oxide in the following range:

$$0.2 \leqq Li/(Na+K+Li) \leqq 0.5.$$

If the rate of Li is less than 0.2, the heat expansion coefficient becomes too large in comparison with the alumina substrate. As a result, the crazing may be easily produced to make the glaze baked surface finish insufficient. On the other hand, if the rate of Li component exceeds 0.5, this may give an adverse influence to the insulating property of the glaze layer because the Li ion has a comparatively high degree of immigration among the alkaline metal ions. It is preferable that the value of Li/(Na+K+Li) is adjusted in the range of 0.3 to 0.45.

In the following description, explanation will be made to other components which can be contained in the glaze layer. At first, as auxiliary fluidity improving components, one kind or more of Mo, W, Ni, Co, Fe and Mn are contained 0.5 to 5 mol % in total in terms of $MoO_3$, $WO_3$, $Ni_3O_4$, $CoO_3O_4$, $Fe_2O_3$ and $MnO_2$, respectively. If being less than 0.5 mol %, an effect is insufficient, while being more than 5 mol %, the dilatometric softening point of the glaze exceedingly goes up, and the glaze-baking is difficult or impossible. Among the auxiliary fluidity improving components, the most remarkable fluidity improving effects are Mo and Fe, and next is W.

As each of these auxiliary fluidizing improving components is transition element, an excessive addition contributes to inconvenience of causing unintentional coloring in the glaze layer (this might be a problem when using the rare earth element as the fluidity improving component).

It is possible to contain one kind or more of Ti, Zr and Hf 0.5 to 5 mol % in total in terms of $ZrO_2$, $TiO_2$ and $HfO_2$. By containing one kind or more of Ti, Zr or Hf, a water resistance is improved. As to the Zr or Hf components, the improved effect of the water resistance of the glaze layer is more noticeable. By the way, "the water resistance is good" is meant that if, for example, a powder like raw material of the glaze is mixed together with a solvent as water and is left as a glaze slurry for a long time, such inconvenience is difficult to occur as increasing a viscosity of the glaze slurry owing to elusion of the component. As a result, in case of coating the glaze slurry to the insulator, optimization of a coating thickness is easy and unevenness in thickness is reduced. Subsequently, said optimization and said reduction can be effectively attained. If being less than 0.5 mol %, the effect is poor, and if being more than 5 mol %, the glaze layer is ready for devitrification.

It is possible to contain 1 to 15 mol % in total of one kind or more of the Al component 1 to 10 mol % in terms of $Al_2O_3$, the Ca component 1 to 10 mol % in terms of CaO, and the Mg component 1 to 10 mol % in terms of MgO. The Al component has an effect of restraining the devitrification of the glaze layer, the Ca component and the Mg component contribute to improvement of the insulating property of the glaze layer. In particular, the Ca component is effective next to the Ba component or the Zn component for increasing the insulating property of the glaze layer. If the addition amount is less than each of the above mentioned lower limits, the effect is insufficient, while being more than the upper limit of each of the components or the upper limit of the total amount, the dilatometric softening point exceedingly increases and the glaze-baking might be difficult or impossible.

The glaze layer may contain auxiliary components of one kind or more of Sn, P, Cu, and Cr 5 mol % or less in total as Sn in terms of $SnO_2$, P in terms of $P_2O_5$, Cu in terms of CuO, and Cr in terms of $Cr_2O_3$. These components may be positively added in response to purposes or often inevitably included as raw materials of the glaze (otherwise later mentioned clay minerals to be mixed when preparing the glaze slurry) or impurities (otherwise contaminants) from refractory materials in the melting procedure for producing glaze frit. Each of them heightens the fluidity when baking the glaze, restrains bubble formation in the glaze layer, or wraps adhered materials on the baked glaze surface so as to prevent abnormal projections.

In the structure of the spark plug of the invention, the respective components in the glaze are contained in the forms of oxides, and owing to factors forming amorphous and vitreous phases, the existing forms by oxides cannot be often identified. In this case, if the containing amounts of components at values in terms of oxides in the glaze layer fall in the above mentioned ranges, it is regarded that they belong to the ranges of the invention.

Herein, the containing amounts of the respective components in the glaze layer formed on the insulator can be identified by use of known micro-analyzing methods such as EPMA (electronic probe micro-analysis) or XPS (X-ray photoelectron spectroscopy). For example, if using EPMA, either of a wavelength dispersion system and an energy dispersion system is sufficient for measuring characteristic X-ray. Further, there is a method where the glaze layer is peeled from the insulator and is subjected to a chemical analysis or a gas analysis for identifying the composition.

The spark plug having the glaze layer of the invention may be composed by furnishing, in a crazing hole of the insulator, an axially shaped terminal metal fixture as one body with the center electrode or by holding a conductive bonding layer in relation therewith, said metal fixture being separate from a center electrode. In this case, the whole of the spark plug is kept at around 500° C., and an electric conductivity is made between the terminal metal fixture and a metal shell, enabling to measure the insulating resistant value. For securing an insulating endurance at high temperatures, it is desirable that the insulating resistant value is secured 200 MΩ or higher, desirably 400 MΩ so as to prevent the flashover.

The measurement may be carried out as follows. DC constant voltage source (e.g., source voltage 1000 V) is connected to the side of a terminal metal 13 of the spark plug 100 shown in FIG. 1, while at the same time, the side of the metal shell 1 is grounded, and a current is passed under a condition where the spark plug 100 disposed in a heating oven is heated at 500° C. For example, imagining that a current value Im is measured by use of a current measuring resistance (resistance value Rm) at the voltage VS, an insulation resistance value Rx to be measured can be obtained as (VS/Im)−Rm.

The insulator may be composed of the alumina insulating material containing the Al component 85 to 98 mol % in terms of $Al_2O_3$. Preferably, the glaze layer has an average thermal expansion coefficient of $5\times10^{-6}$/° C. to $8.5\times10^{-6}$/° C. at the temperature ranging 20 to 350° C. Being less than this lower limit, defects such as cracking or graze skipping easily happen in the graze layer. On the other hand, being more than the upper limit, defects such as crazing are easy to happen in the graze layer. The thermal expansion coefficient more preferably ranges $6\times10^{-6}$/° C. to $8\times10^{-6}$/° C.

The thermal expansion coefficient of the glaze layer is assumed in such ways that samples are cut out from a vitreous glaze bulk body prepared by mixing and melting raw materials such that almost the same composition as the glaze layer is realized, and values measured by a known dilatometer method. The thermal expansion coefficient of the glaze layer on the insulator can be measured by use of, e.g., a laser inter-ferometer or an interatomic force microscope.

The insulator may be formed with a projection part radially extending from the outer periphery at the middle portion in the axial direction thereof, and may be formed cylindrically in an outer periphery of the base portion thereof adjacent the rear side with respect to the projection part thereof with a forward portion extending toward a forward end of the center electrode in the axial direction. In general, as to automobile engines, a rubber cap is utilized to attach the spark plug to the electric system of engines. In order to heighten the anti-flashover, adhesion between the insulator and the interior of the rubber cap is important. Therefore, the glaze layer desirably is smooth at a maximum height of 7 μm or less in a curve of a surface roughness in accordance to the measurement prescribed by JIS:B0601 at the outer periphery (outer circumferential face) of the base portion.

According to the study by the inventors, it was found that as to borosilicate glass based- or alkaline borosilicate glass based leadless glaze layer, it was important to adjust the film thickness of the glaze layer for obtaining the smooth surface of the glaze layer. Further, it was found that since the outer periphery in the base portion of the insulator main part is required to closely contact the rubber cap, the adjustment of film thickness, if properly conducted, will increase the anti-flashover. In the insulator having the leadless glaze layer, it is desirable to adjust the film thickness of the glaze layer covering the outer periphery in the base portion of the insulator main part within the range of 7 to 50 μm. Thus, the close contact may be obtained between the glaze baked surface and the rubber cap without lowering the insulating property of the glaze layer, and in turn the anti-flashover may be obtained.

In case the thickness of the glaze layer in the insulator is less than 7 μm, it is difficult to form the uniform and smooth glaze baked surface in the leadless glaze layer of the above mentioned composition, and the close contact between the glaze baked surface and the rubber cap is spoiled, so that the anti-flashover is made insufficient. On the other hand, in case the thickness of glaze layer exceeds 50 μm, a cross sectional area of conductivity increases, so that it is difficult to secure the insulating property with the leadless glaze layer of the mentioned composition, similarly, resulting in lowering of the anti-flashover.

For making the thickness of the glaze layer uniform and restraining the glaze layer from excessive (or local) thickness, the addition of Ti, Zr or Hf is useful as mentioned above.

The spark plug of the invention can be produced by a production method comprising:

- a step of preparing glaze powders in which the raw material powders are mixed at a predetermined ratio, the mixture is heated 1000 to 1500° C. and melted, the melted material is rapidly cooled, vitrified and ground into powder;
- a step of piling the glaze powder on the surface of an insulator to form a glaze powder layer; and
- a step of heating the insulator, thereby to bake the glaze powder layer on the surface of the insulator.

The powdered raw material of each component includes not only an oxide thereof (sufficient with complex oxide) but also other inorganic materials such as hydroxide, carbonate, chloride, sulfate, nitrate, or phosphate. These inorganic materials should be those of capable of being converted to oxides by heating and melting. The rapidly cooling can be carried out by throwing the melt into a water or atomizing the melt onto the surface of a cooling roll for obtaining flakes.

The glaze powder is dispersed into the water or solvent, so that it can be used as a glaze slurry. For example, if coating the glaze slurry onto the insulator surface to dry it, the piled layer of the glaze powder (the glaze powder layer) can be formed as a coating layer of the glaze slurry. By the way, as the method of coating the glaze slurry on the insulator surface, if adopting a method of spraying from an atomizing nozzle onto the insulator surface, the glaze powder layer in uniform thickness of the glaze powder can be easily formed and an adjustment of the coated thickness is easy.

The glaze slurry can contain an adequate amount of a clay mineral or an organic binder for heightening a shape retention of the glaze powder layer. As the clay mineral, those composed of mainly aluminosolicate hydrates can be applied, for example, those composed of mainly one kind or more of allophane, imogolite, hisingerite, smectite, kaolinite, halloysite, montmorillonite, illite, vermiculite, and dolomite (or mixtures thereof) can be used. In relation with the oxide components, in addition to $SiO_2$ and $Al_2O_3$, those mainly containing one kind or more of $Fe_2O_3$, $TiO_2$, CaO, MgO, $Na_2O$ and $K_2O$ can be used.

The spark plug of the invention is constructed of an insulator having a through hole formed in the axial direction thereof, a terminal metal fixture fitted in one end of the through hole, and a center electrode fitted in the other end. The terminal metal fixture and the center electrode are electrically connected via an electrically conductive sintered body mainly comprising a mixture of a glass and a conductive material (e.g., a conductive glass seal or a resistor). The spark plug having such a structure can be made by a process including the following steps.

An assembly step: a step of assembling a structure comprising the insulator having the through hole, the terminal metal fixture fitted in one end of the through hole, the center electrode fitted in the other end, and a filled layer formed between the terminal metal fixture and the center electrode, which (filled layer) comprises the glass powder and the conductive material powder.

A glaze baking step: a step of heating the assembled structure formed with the glaze powder layer on the surface of the insulator at temperature ranging 800 to 950° C. to bake the glaze powder layer on the surface of the insulator so as to form a glaze layer, and at the same time softening the glass powder in the filled layer.

A pressing step: a step of bringing the center electrode and the terminal metal fixture relatively close within the through hole, thereby pressing the filled layer between the center electrode and the terminal metal fixture into the electrically conductive sintered body.

In this case, the terminal metal fixture and the center electrode are electrically connected by the electrically conductive sintered body to concurrently seal the gap between the inside of the through hole and the terminal metal fixture and the center electrode. Therefore, the glaze baking step also serves as a glass sealing step. This process is efficient in that the glass sealing and the glaze baking are performed simultaneously. Since the above mentioned glaze allows the baking temperature to be lower to 800 to 950° C., the center electrode and the terminal metal fixture hardly suffer from bad production owing to oxidation so that the yield of the spark plug is heightened. It is also sufficient that the baking glaze step is preceded to the glass sealing step.

The dilatometric softening point of the glaze layer is preferably adjusted to range, e.g., 520 to 700° C. When the dilatometric softening point is higher than 700° C., the baking temperature above 950° C. will be required to carry out both baking and glass sealing, which may accelerate oxidation of the center electrode and the terminal metal fixture. When the dilatometric softening point is lower than 520° C., the glaze baking temperature should be set lower than 800° C. In this case, the glass used in the conductive sintered body must have a low dilatometric softening point in order to secure a satisfactory glass seal. As a result, when an accomplished spark plug is used for a long time under a relatively high temperature environment, the glass in the conductive sintered body is liable to denaturalization, and where, for example, the conductive sintered body comprises a resistor, the denaturalization of the glass tends to result in deterioration of the performance such as a life under load. Incidentally, the dilatometric softening point of the glaze is adjusted at temperature range of 520 to 620° C.

The dilatometric softening point of the glaze layer is a value measured by performing a differential thermal analysis on the glaze layer peeled off from the insulator and heated, and it is obtained as a temperature of a peak appearing next to a first endothermic peak (that is, a second endothermic peak) which is indicative of a sag point. The dilatometric softening point of the glaze layer formed in the surface of the insulator can be also estimated from a value obtained with a glass sample which is prepared by compounding raw materials so as to give substantially the same composition as the glaze layer under analysis, melting the composition and rapidly cooling.

A whole front and cross sectional view showing the spark plug according to the invention;

[FIG. 2]

A front view showing an external appearance of the insulator together with the glaze layer; and

Figures 3A, 3B:
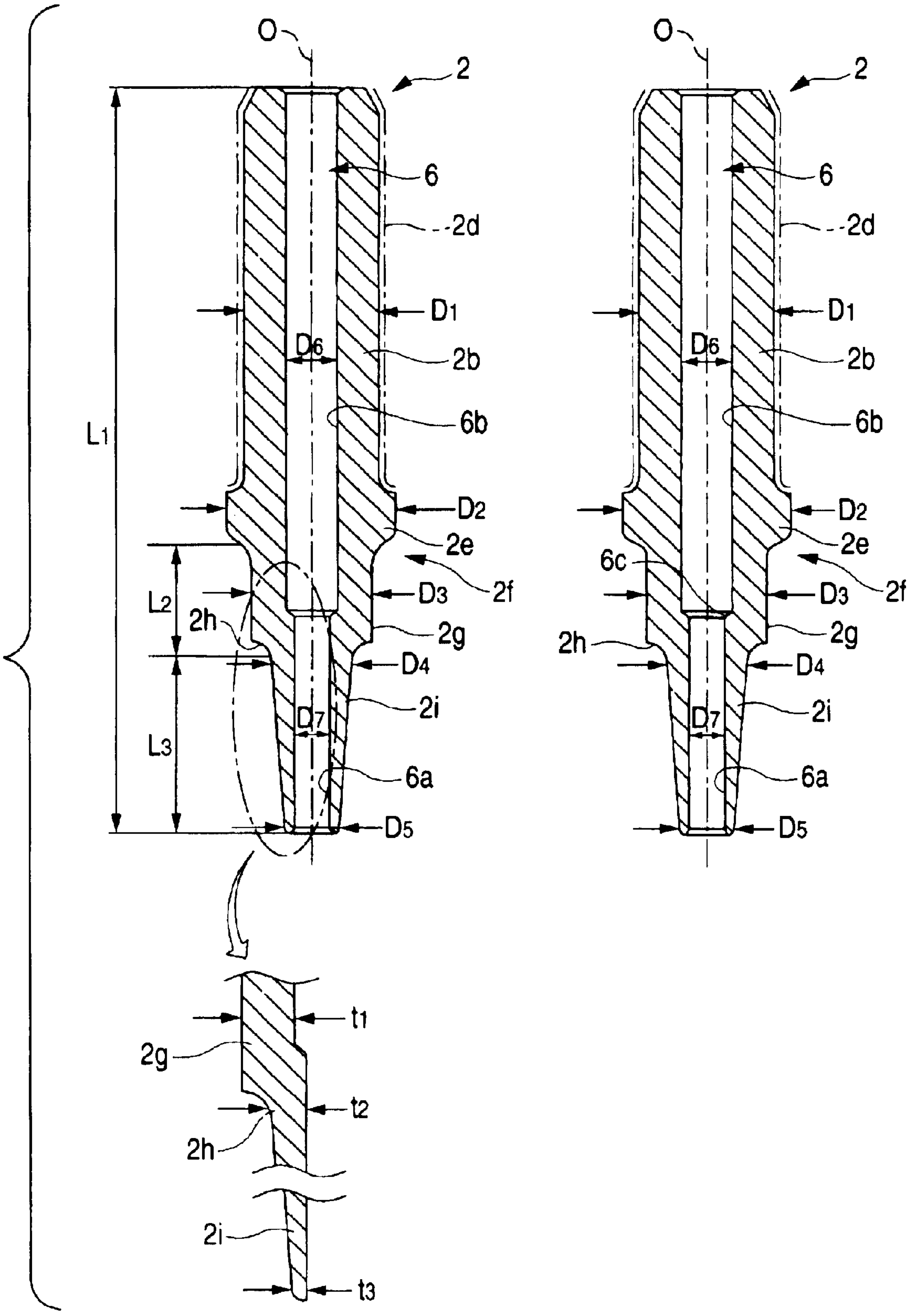

[FIGS. 3A and 3B]

Vertical cross sectional views showing some examples of the insulator.

DETAILED DESCRIPTION OF THE INVENTION

Figure 1:
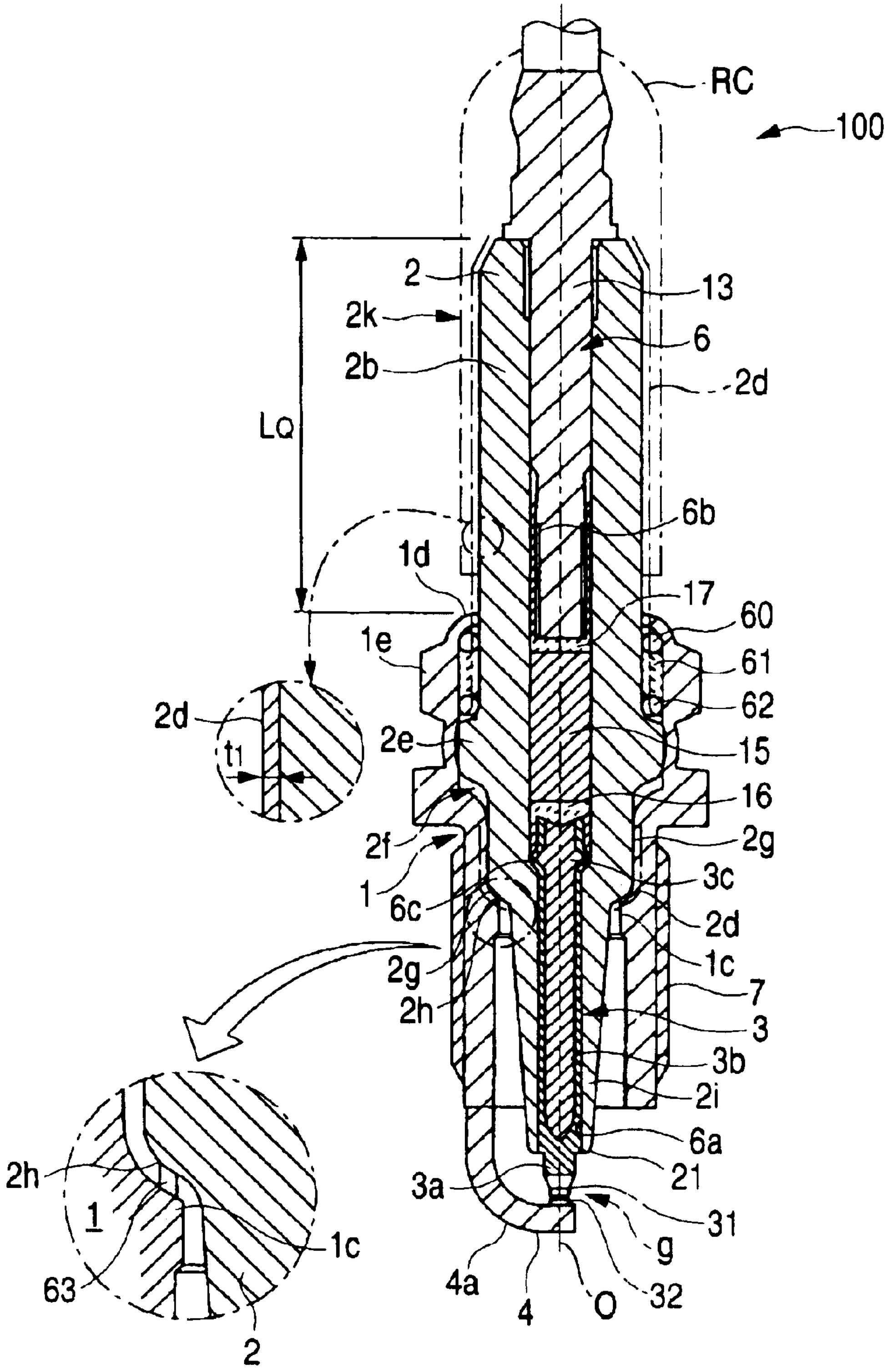
[FIG. 1]

Modes for carrying out the invention will be explained with reference to the accompanying drawings showing embodiments. FIG. 1 shows an example of the spark plug of the first structure according to the invention. The spark plug 100 has a cylindrical metal shell 1, an insulator 2 fitted in the inside of the metal shell 1 with its tip 21 projecting from the front end of the metal shell 1, a center electrode 3 disposed inside the insulator 2 with its ignition part 31 formed at the tip thereof, and a ground electrode 4 with its one end welded to the metal shell 1 and the other end bent inward such that a side of this end may face the tip of the center electrode 3. The ground electrode 4 has an ignition part 32 which faces the ignition part 31 to make a spark gap g between the facing ignition parts 32.

The metal shell 1 is formed to be cylindrical of a metal such as a low carbon steel. It has a thread 7 therearound for screwing the spark plug 100 into an engine block (not shown). Symbol 1*e* is a hexagonal nut portion over which a tool such as a spanner or wrench fits to fasten the metal shell 1.

The insulator 2 has a through hole 6 penetrating in the axial direction. A terminal fixture 13 is fixed in one end of the through hole 6, and the center electrode 3 is fixed in the other end. A resistor 15 is disposed in the through hole 6 between the terminal metal fixture 13 and the center electrode 3. The resistor 15 is connected at both ends thereof to the center electrode 3 and the terminal metal fixture 13 via the conductive glass seal layers 16 and 17, respectively. The resistor 15 and the conductive glass seal layers 16, 17 constitute the conductive sintered body. The resistor 15 is formed by heating and pressing a mixed powder of the glass powder and the conductive material powder (and, if desired, ceramic powder other than the glass) in a later mentioned glass sealing step. The resistor 15 may be omitted, and the terminal metal fixture 13 and the center electrode 3 may be integrally constituted by one seal layer of the conductive glass seal.

The insulator 2 has the through hole 6 in its axial direction for fitting the center electrode 3, and is formed as a whole with an insulating material as follows. That is, the insulating material is mainly composed of an alumina ceramic sintered body having an Al content of 85 to 98 mol % (preferably 90 to 98 mol %) in terms of $Al_2O_3$.

The specific components other than Al are exemplified as follows.

Si component: 1.50 to 5.00 mol % in terms of $SiO_2$;

Ca component: 1.20 to 4.00 mol % in terms of CaO;

Mg component: 0.05 to 0.17 mol % in terms of MgO;

Ba component: 0.15 to 0.50 mol % in terms of BaO; and

B component: 0.15 to 0.50 mol % in terms of $B_2O_3$.

The insulator 2 has a projection part 2*e* projecting outwardly, e.g., flange-like on its periphery at the middle part in the axial direction, a rear portion 2*b* whose outer diameter is smaller than the projection part 2*e*, a first front portion 2*g* in front of the projection part 2*e*, whose outer diameter is smaller than the projection part 2*e*, and a second front portion 2*i* in front of the first front portion 2*g*, whose outer diameter is smaller than the first front portion 2*g*. The outer circumferential face of the first front portion 2*g* is almost cylindrical, while the second front portion 2*i* is tapered toward the tip 21.

On the other hand, the center electrode 3 has a smaller diameter than that of the resistor 15. The through hole 6 of the insulator 2 is divided into a first portion 6*a* (front portion) having a circular cross section in which the center electrode 3 is fitted and a second portion 6*b* (rear portion) having a circular cross section with a larger diameter than that of the first portion 6*a*. The terminal metal fixture 13 and the resistor 15 are disposed in the second portion 6*b*, and the center electrode 3 is inserted in the first portion 6*a*. The center electrode 3 has an outward projection 3*c* around its periphery near the rear end thereof, with which it is fixed to the electrode. A first portion 6*a* and a second portion 6*b* of the through hole 6 are connected each other in the first front portion 2*g* in FIG. 3A, and at the connecting part, a projection receiving face 6*c* is tapered or rounded for receiving the projection 3*c* for fixing the center electrode 3.

The first front portion 2*g* and the second front portion 2*i* of the insulator 2 connect at a connecting part 2*h*, where a stepped difference is formed on the outer surface of the insulator 2. The metal shell 1 has a projection 1*c* on its inner wall at the position meeting the connecting part 2*h* so that the connecting part 2*h* fits the projection 1*c* via a gasket ring 63 thereby to prevent slipping in the axial direction. A gasket ring 62 is disposed between the inner wall of the metal shell 1 and the outer side of the insulator 2 at the rear of the flange-like projection part 2*e*, and a gasket ring 60 is provided in the rear of the gasket ring 62. The space between the two gaskets 60 and 62 is filled with a filler 61 such as talc. The insulator 2 is inserted into the metal shell 1 toward the front end thereof, and under this condition, the rear opening edge of the metal shell 1 is pressed inward the gasket 60 to form a sealing lip 1*d*, and the metal shell 1 is secured to the insulator 2.

FIGS. 3A and 3B show practical examples of the insulator 2. The dimensions of these insulators are as follows.

Total length L1: 30 to 75 mm;

Length L2 of the first front portion 2*g*: 0 to 30 mm (exclusive of the connecting part 2*f* to the projection part 2*e* and inclusive of the connecting part 2*h* to the second front portion 2*i*);

Length L3 of the second front portion 2*i*: 2 to 27 mm;

Outer diameter D1 of the main portion 2*b*: 9 to 13 mm;

Outer diameter D2 of the projection part 2*e*: 11 to 16 mm;

Outer diameter D3 of the first front portion 2*g*: 5 to 11 mm;

Outer base diameter D4 of the second front portion 2*i*: 3 to 8 mm;

Outer tip diameter D5 of the second front portion 2*i* (where the outer circumference at the tip is rounded or beveled, the outer diameter is measured at the base of the rounded or beveled part in a cross section containing the center axial line O): 2.5 to 7 mm;

Inner diameter D6 of the second portion 6*b* of the through hole 6: 2 to 5 mm;

Inner diameter D7 of the first portion 6*a* of the through hole 6: 1 to 3.5 mm;

Thickness t1 of the first front portion 2*g*: 0.5 to 4.5 mm;

Thickness t2 at the base of the second front portion 2*i* (the thickness in the direction perpendicular to the center axial line 0): 0.3 to 3.5 mm;

Thickness t3 at the tip of the second front portion 2*i* (the thickness in the direction perpendicular to the center axial line O; where the outer circumference at the tip is rounded or beveled, the thickness is measured at the base of the rounded or beveled part in a cross section containing the center axial line O): 0.2 to 3 mm; and Average thickness tA ((t2+t3)/2) of the second front portion 2*i:* 0.25 to 3.25 mm.

In FIG. 1, a length LQ of the portion 2*k* of the insulator 2 which projects over the rear end of the metal shell 1, is 23 to 27 mm (e.g., about 25 mm).

The insulator 2 shown in FIG. 3A has the following dimensions. L1=about 60 mm, L2=about 10 mm, L3=about 14 mm, D1=about 11 mm, D2=about 13 mm, D3=about 7.3 mm, D4=5.3 mm, D5=4.3 mm, D6=3.9 mm, D7=2.6 mm, t1=3.3 mm, t2=1.4 mm, t3=0.9 mm, and tA=1.15 mm.

The insulator 2 shown in FIG. 3B is designed to have slightly larger outer diameters in its first and second front portions 2*g* and 2*i* than in the example shown in FIG. 3A. It has, for example, the following dimensions. L1=about 60 mm, L2=about 10 mm, L3=about 14 mm, D1=about 11 mm, D2=about 13 mm, D3=about 9.2 mm, D4=6.9 mm, D5=5.1 mm, D6=3.9 mm, D7=2.7 mm, t1=3.3 mm, t2=2.1 mm, t3=1.2 mm, and tA=1.65 mm.

Figure 2:
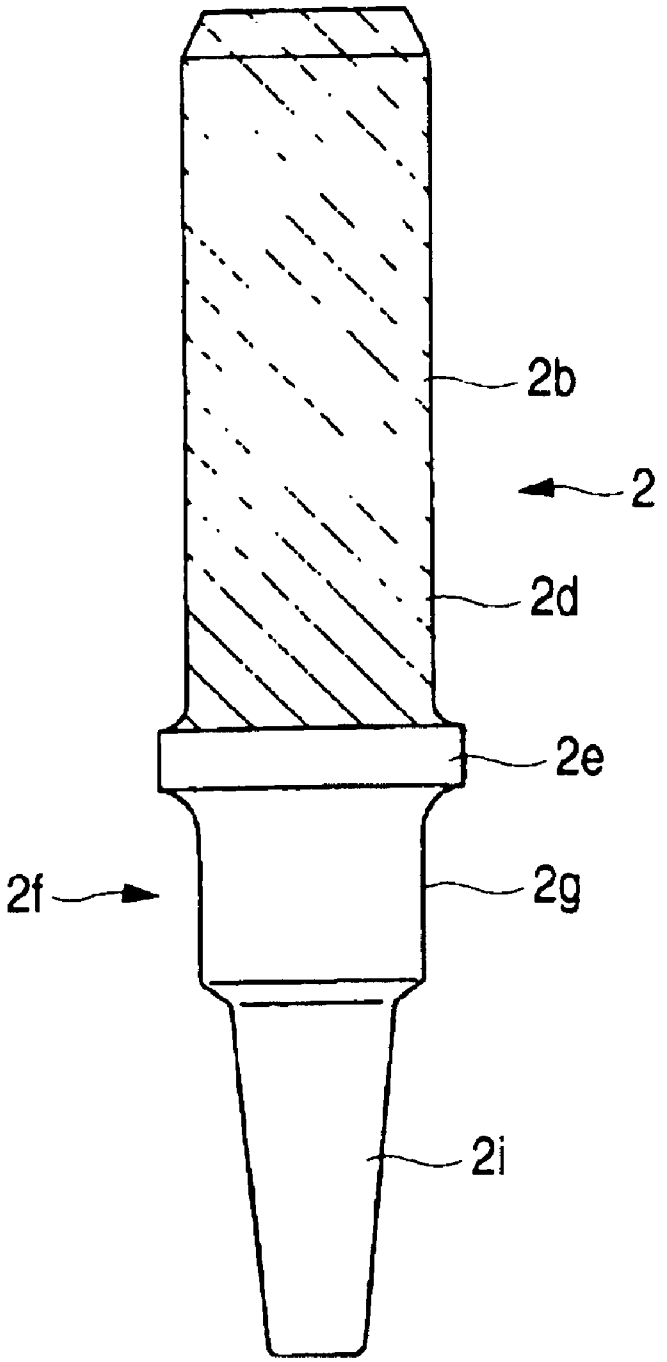

As shown in FIG. 2, the glaze layer 2*d* is formed on the outer surface of the insulator 2, more specifically, on the outer peripheral surface of the rear portion 2*b*. The glaze layer 2*d* has a thickness of 7 to 150 $\mu$m, preferably 10 to 50 $\mu$m. As shown in FIG. 1, the glaze layer 2*d* formed on the rear portion 2*b* extends in the front direction farther from the rear end of the metal shell 1 to a predetermined length, while the rear side extends till the rear end edge of the rear portion 2*b*.

The glaze layer 2*d* has the compositions explained in the columns of the Means for solving the Problems, Works and Effects. As the critical meaning in the composition range of each component has been referred to in detail, no repetition will be made herein. The thickness tg (average value) of the glaze layer 2*d* on the outer circumference of the base of the rear portion 2*b* of the insulator (the cylindrical and outer circumference part projecting downward from the metal shell 1) is 7 to 50 $\mu$m.

Now turning to FIG. 1, the ground electrode 4 and the core 3*a* of the center electrode 3 are made of an Ni alloy. The core 3*a* of the center electrode 3 is buried inside with a core material 3*b* composed of Cu or Cu alloy for accelerating heat dissipation. An ignition part 31 and an opposite ignition part 32 are mainly made of a noble metal alloy based on one kind or more of Ir, Pt and Rh. The core 3*a* of the center electrode 3 is reduced in diameter at a front end and is formed to be flat at the front face, to which a disk made of the alloy composing the ignition part is superposed, and the periphery of the joint is welded by a laser welding, electron beam welding, or resistance welding to form a welded part, thereby constructing the ignition part 31. The opposite ignition part 32 positions a tip to the ground electrode 4 at the position facing the ignition part 31, and the periphery of the joint is welded to form a similar welded part along an outer edge part. The tips are, for obtaining, e.g., the compositions shown in Tables, prepared by a molten metal comprising alloying components at a predetermined ratio or forming and sintering an alloy powder or a mixed powder of metal shaving a predetermined ratio. At least one of the ignition part 31 and the opposite ignition part 32 may be omitted.

The spark plug 100 can be produced as follows. At first, as to the insulator 2, an alumina powder is mixed with raw material powders of a Si component, Ca component, Mg component, Ba component, and B component such that a predetermined mixing ratio is obtained in the above mentioned composition in terms of oxides after sintering, and the mixed powder is mixed with a predetermined amount of a binder (e.g., PVA) and a water to prepare a slurry for forming the spark plug. The raw material powders include, for example, $SiO_2$ powder as the Si component, $CaCO_3$ powder as the Ca component, MgO powder as the Mg component, $BaCO_3$ or $BaSO_4$ as the Ba component, and $H_3PO_3$ as the B component. $H_3BO_3$ may be added in the form of a solution.

A slurry is spray-dried into granules for forming a base, and the base forming particles are rubber-pressed into a pressed body a prototype of the insulator. The formed body is processed on an outer side by grinding to the contour of the insulator 2 shown in FIG. 1, and then baked 1400 to 1600° C. to obtain the insulator 2.

The glaze slurry is prepared as follows.

Raw material powders as sources of Si, B, Zn, Ba, alkaline components (Na, K, Li), and raw powders (for example, the Si component is $SiO_2$ powder, the B component is $H_3BO_3$ powder, the Zn component is ZnO powder, the Ba component is $BaCO_3$ or $BaSO_4$ powder, Na is $Na_2CO_3$ powder, K is $K_2CO_3$ powder, and Li is $Li_2CO_3$ powder) are mixed for obtaining a predetermined composition. The F component is added in a form of silicon fluoride high polymer or graphite fluoride. The mixed powder is heated and melted 1000 to 1500° C., and thrown into the water to rapidly cool for vitrification, followed by grinding to prepare a glaze fritz. The glaze fritz is mixed with appropriate amounts of clay mineral, such as kaolin or gairome clay, and organic binder, and the water is added thereto to prepare the glaze slurry.

The glaze slurry is sprayed from a nozzle to coat a requisite surface of the insulator, thereby to form a coating layer of the glaze slurry as the glaze powder layer, and this is dried.

The center electrode 3 and the terminal metal fixture 13 are fitted in the insulator 2 formed with the glaze slurry coating layer, as well as the resistor 15 and the electrically conductive glass seal layers 16, 17 are formed as follows. The center electrode 3 is inserted into the first portion 6*a* of the through hole 6. A conductive glass powder is filled. The powder is preliminary compressed by pressing a press bar into the through hole 6 to form a first conductive glass powder layer. A raw material powder for a resistor composition is filled and preliminary compressed in the same manner, so that the first conductive glass powder, the resistor composition powder layer and a second conductive glass powder layer are laminated from the center electrode 3 (lower side) into the through hole 6.

An assembled structure is formed where the terminal metal fixture is disposed from the upper part into the through hole. The assembled structure is put into a heating oven and heated at a predetermined temperature of 800 to 950° C. being above the glass dilatometric softening point, and then the terminal metal fixture 13 is pressed into the through hole 6 from a side opposite to the center electrode 3 so as to press the superposed layers in the axial direction. Thereby, as seen in FIG. 1, the layers are each compressed and sintered to become a conductive glass seal layer 16, a resistor 15, and a conductive glass seal layer 17 (the above is the glass sealing step).

If the dilatometric softening point of the glaze powder contained in the glaze slurry coating layer is set to be 520 to 700° C., the glaze slurry coating layer can be baked at the same time as the heating in the above mentioned glass sealing step, into the glaze layer 2*d*. If the heating temperature of the glass sealing step is selected from the relatively low temperature as 800 to 950° C., oxidation to surfaces of the center electrode 3 and the terminal metal fixture 13 can be made less to occur.

If a burner type-gas furnace is used as the heating oven (which also serves as the glaze baking oven), a heating atmosphere contains relatively much steam as a combustion product. If the glaze composition containing the B component of 40 mol % or less is used, the fluidity when baking the glaze can be secured even in such an atmosphere, and it is possible to form the glaze layer of smooth and homogeneous substance and excellent in the insulation. The glaze-baking step can be in advance performed prior to the glass sealing step.

After the glass sealing step, the metal shell 1, the ground electrode 4 and others are fitted on the structure to complete spark plug 100 shown in FIG. 1. The spark plug 100 is screwed into an engine block using the thread 7 thereof and used as a spark source to ignite an air/fuel mixture supplied to a combustion chamber. A high-tension cable or an ignition coil is connected to the spark plug 100 by means of a rubber cap RC (composed of, e.g., silicone rubber) as shown with an imaginary line in FIG. 1. The rubber cap RC has a smaller hole diameter than the outer diameter D1 (FIG. 3) of the rear portion 2*b* by about 0.5 to 1.0 mm. The rear portion 2*b* is pressed into the rubber cap while elastically expanding the hole until it is covered therewith to its base. As a result, the rubber cap RC comes into close contact with the outer surface of the rear portion 2*b* to function as an insulating cover for preventing flashover.

By the way, the spark plug of the invention is not limited to the type shown in FIG. 1, but, for example, the tip of the ground electrode is made face the side of the center electrode to form an ignition gap. Further, a semi-planar discharge type spark plug is also useful where the front end of the insulator is advanced between the side of the center electrode and the front end of the ground electrode.

EXAMPLES

For confirmation of the effects according to the invention, the following experiments were carried out.

Experimental Example 1

The insulator 2 was made as follows. Alumina powder (alumina content: 95 mol %; Na content (as $Na_2O$): 0.1 mol %; average particle size: 3.0 μm) was mixed at a predetermined mixing ratio with $SiO_2$ (purity: 99.5%; average particle size: 1.5 μm), $CaCO_3$ (purity: 99.9%; average particle size: 2.0 μm), MgO (purity: 99.5%; average particle size: 2 μm) $BaCO_3$ (purity: 99.5%; average particle size: 1.5 μm), $H_3BO_3$ (purity: 99.0%; average particle size 1.5 μm), and ZnO (purity: 99.5%, average particle size: 2.0 μm). To 100 parts by weight of the resulting mixed powder were added 3 mass parts of PVA as a hydrophilic binder and 103 mass parts of water, and the mixture was kneaded to prepare a slurry.

The resulting slurries with different compositions were spray-dried into spherical granules, which were sieved to obtain fraction of 50 to 100 μm. The granules were formed under a pressure of 50 MPa by a known rubber-pressing method. The outer surface of the formed body was machined with the grinder into a predetermined figure and baked at 1550° C. to obtain the insulator 2. The X-ray fluorescence analysis revealed that the insulator 2 had the following composition.

Al component (as $Al_2O_3$): 94.9 mol %;

Si component (as $SiO_2$): 2.4 mol %;

Ca component (as CaO): 1.9 mol %;

Mg component (as MgO): 0.1 mol %;

Ba component (as BaO): 0.4 mol %; and

B component (as $B_2O_3$): 0.3 mol %.

The insulator 2 shown in FIG. 3A has the following dimensions. L1=about 60 mm, L2=about 8 mm, L3=about 14 mm, D1=about 10 mm, D2=about 13 mm, D3=about 7 mm, D4=5.5, D5=4.5 mm, D6=4 mm, D7=2.6 mm, t1=1.5 mm, t2=1.45 mm, t3=1.25 mm, and tA=1.35 mm. In FIG. 1, a length LQ of the portion 2*k* of the insulator 2 which projects over the rear end of the metal shell 1, is 25 mm.

Next, the glaze slurry was prepared as follows. $SiO_2$ powder (purity: 99.5%), $Al_2O_3$ powder (purity: 99.5%), $H_3BO_3$ powder (purity: 98.5%), $Na_2CO_3$ powder (purity: 99.5%), $K_2CO_3$ powder (purity: 99%), $Li_2CO_3$ powder (purity: 99%), $BaSO_4$ powder (purity: 99.5%), $SrCO_3$ powder (purity: 99%), ZnO powder (purity: 99.5%), $MoO_3$ powder (purity: 99%), $Fe_2O_3$ powder (purity: 99%), $WO_3$ powder (purity: 99%), $Ni_3O_4$ powder (purity: 99%), $Co_3O_4$ powder (purity 99%), $MnO_2$ powder (purity: 99%), CaO powder (purity: 99.5%), $TiO_2$ powder (purity: 99.5%), $ZrO_2$ powder (purity: 99.5%), $HfO_2$ powder (purity: 99%), MgO powder (purity: 99.5%), $Sb_2O_5$ powder (purity: 99%), $Bi_2O_3$ powder (purity: 99%), $SC_2O_3$ powder (purity: 99%), $Y_2O_3$ powder (purity: 99.5%), $La_2O_3$ powder (purity: 99%), $CeO_2$ powder (purity: 99%), $Pr_7O_{11}$ powder (purity: 99%), $Nd_2O_3$ powder (purity: 99%), $Sm_2O_3$ powder (purity: 99%), $Eu_2O_3$ powder (purity: 99%), $Gd_2O_3$ powder (purity: 99%), $Tb_2O_3$ powder (purity: 99%), $Dy_2O_3$ powder (purity: 99%), $Ho_2O_3$ powder (purity: 99%), $Er_2O_3$ powder (purity: 99%), $Tm_2O_3$ powder (purity: 99%), $Yb_2O_3$ powder (purity: 99%), $Lu_2O_3$ powder (purity: 99%), $Bi_2O_3$ powder (purity: 99%), $SnO_2$ powder (purity: 99.5%), $P_2O_5$ powder (purity: 99%), CuO powder (purity: 99%), and $Cr_2O_3$ powder (purity: 99.5%) were mixed. The mixture was melted 1000 to 1500° C., and the melt was poured into the water and rapidly cooled for vitrification, followed by grinding in an alumina pot mill to powder of 50 μm or smaller. To 100 parts by weight of the glaze powder, 3 parts by weight of New Zealand kaolin and 2 parts by weight of PVA as an organic binder were mixed, and the mixture was kneaded with 100 parts by weight of the water to prepare the glaze slurry.

The glaze slurry was sprayed on the insulator 2 from the spray nozzle, and dried to form the coating layer of the glaze slurry having a coated thickness of about 100 μm. Several kinds of the spark plug 100 shown in FIG. 1 were produced by using the insulator 2. The outer diameter of the thread 7 was 14 mm. The resistor 15 was made of the mixed powder consisting of $B_2O_3$—$SiO_2$—BaO—$LiO_2$ glass powder, $ZrO_2$ powder, carbon black powder, $TiO_2$ powder, and metallic Al powder. The electrically conductive glass seal layers 16, 17 were made of the mixed powder consisting of $B_2O_3$—$SiO_2$—$Na_2O$ glass powder, Cu powder, Fe powder, and Fe—B powder. The heating temperature for the glass sealing, i.e., the glaze baking temperature was set at 900° C.

On the other hand, the glaze which was not pulverized but solidified into a mass was produced. It was confirmed that the massive glaze was vitrified (amorphous) by the X-ray diffraction, and the massive glaze was performed with the following experiment.

① Analysis of the chemical composition: By the fluorescent X-ray analysis. Analyzed values of the respective samples (in terms of oxide) are shown in Tables 1 to 7. The compositions of the glaze layer 2*d* formed on the surface of the insulator 2 were measured by the EPMA method, and it was confirmed that the measured results almost met the analyzed values measured by use of the massive samples.

② Thermal expansion coefficient: The specimen of 5 mm×5 mm×5 mm was cut out from the block-like sample, and measured with the known dilatometer method at the temperature ranging 20 to 350° C. The same measurement was made at the same size of the specimen cut out from the insulator 2. As a result, the value was $73\times10^{-7}$/° C.

③ Dilatometric softening point: The powder sample weighing 50 mg was subjected to the differential thermal analysis, and the heating was measured from a room temperature. The second endothermic peal was taken as the dilatometric softening point.

TABLE 1

| | (Composition: mol %) | | | | | | |
|---|---|---|---|---|---|---|---|
| | 1 | 2 | 3 | 4 | 5 | 6 | 7 |
| $SiO_2$ | 44.0 | 49.0 | 42.0 | 42.0 | 42.0 | 42.0 | 42.0 |
| $Al_2O_3$ | 1.7 | 1.2 | 1.0 | 1.0 | 1.0 | 1.0 | 1.0 |
| $B_2O_3$ | 28.0 | 26.0 | 29.0 | 29.0 | 29.0 | 29.0 | 29.0 |
| $Na_2O$ | 4.0 | 1.0 | 3.0 | 3.0 | 3.0 | 3.0 | 3.0 |
| $K_2O$ | 3.0 | 2.5 | 3.5 | 3.5 | 3.5 | 3.5 | 3.5 |
| $Li_2O$ | 2.0 | 2.0 | | | | | |
| BaO | 4.5 | 3.5 | 5.0 | 5.0 | 5.0 | 5.0 | 5.0 |
| SrO | | | | | | | |
| ZnO | 8.0 | 8.0 | 10.0 | 10.0 | 10.0 | 10.0 | 10.0 |
| $MoO_3$ | | | 1.5 | 1.5 | 1.5 | 1.5 | 1.5 |
| FeO | | | 1.0 | 1.0 | 1.0 | 1.0 | 1.0 |
| $WO_3$ | | | | | | | |
| $Ni_3O_4$ | | | | | | | |
| $Co_3O_4$ | | | | | | | |
| $MnO_2$ | | | | | | | |
| $SnO_2$ | | | | | | | |
| $P_2O_5$ | | | | | | | |
| CuO | | | | | | | |
| $Cr_2O_3$ | | | | | | | |
| CaO | 4.0 | 1.5 | | | | | |
| $ZrO_2$ | | | | | | | |
| $TiO_2$ | | | | | | | |
| $HfO_2$ | | | | | | | |
| MgO | | | 1.0 | 1.0 | 1.0 | 1.0 | 1.0 |
| $La_2O_3$ | | 0.8 | 3.0 | | | | |
| $Y_2O_3$ | | | | 3.0 | | | |
| $Sc_2O_3$ | | | | | 3.0 | | |
| $CeO_2$ | | | | | | 3.0 | |
| $Pr_7O_{11}$ | | | | | | | 3.0 |
| $Nd_2O_3$ | | | | | | | |
| $Sm_2O_3$ | | | | | | | |
| $Eu_2O_3$ | | | | | | | |
| $Gd_2O_3$ | | | | | | | |
| $Tb_2O_3$ | | | | | | | |
| $Dy_2O_3$ | | | | | | | |
| $Ho_2O_3$ | | | | | | | |
| $Er_2O_3$ | | | | | | | |
| $Tm_2O_3$ | | | | | | | |
| $Yb_2O_3$ | | | | | | | |
| $Lu_2O_3$ | | | | | | | |
| $Sb_2O_3$ | | | | | | | |
| $Bi_2O_3$ | 0.8 | 3.5 | | | | | |
| Total | 100 | 100 | 100 | 100 | 100 | 100 | 100 |

(* is out of the range of the invention)

TABLE 2

| | (Composition: mol %) | | | | | | |
|---|---|---|---|---|---|---|---|
| | 8 | 9 | 10 | 11 | 12 | 13 | 14 |
| $SiO_2$ | 42.0 | 42.0 | 42.0 | 42.0 | 42.0 | 42.0 | 42.0 |
| $Al_2O_3$ | 1.0 | 1.0 | 1.0 | 1.0 | 1.0 | 1.0 | 1.0 |
| $B_2O_3$ | 29.0 | 29.0 | 29.0 | 29.0 | 29.0 | 29.0 | 29.0 |
| $Na_2O$ | 3.0 | 3.0 | 3.0 | 3.0 | 3.0 | 3.0 | 3.0 |
| $K_2O$ | 3.5 | 3.5 | 3.5 | 3.5 | 3.5 | 3.5 | 3.5 |
| $Li_2O$ | | | | | | | |
| BaO | 5.0 | 5.0 | 5.0 | 5.0 | 5.0 | 5.0 | 5.0 |
| SrO | | | | | | | |
| ZnO | 10.0 | 10.0 | 10.0 | 10.0 | 10.0 | 10.0 | 10.0 |

TABLE 2-continued

| | (Composition: mol %) | | | | | | |
|---|---|---|---|---|---|---|---|
| | 8 | 9 | 10 | 11 | 12 | 13 | 14 |
| $MoO_3$ | 1.5 | 1.5 | 1.5 | 1.5 | 1.5 | 1.5 | 1.5 |
| FeO | 1.0 | 1.0 | 1.0 | 1.0 | 1.0 | 1.0 | 1.0 |
| $WO_3$ | | | | | | | |
| $Ni_3O_4$ | | | | | | | |
| $Co_3O_4$ | | | | | | | |
| $MnO_2$ | | | | | | | |
| $SnO_2$ | | | | | | | |
| $P_2O_5$ | | | | | | | |
| CuO | | | | | | | |
| $Cr_2O_3$ | | | | | | | |
| CaO | | | | | | | |
| $ZrO_2$ | | | | | | | |
| $TiO_2$ | | | | | | | |
| $HfO_2$ | | | | | | | |
| MgO | 1.0 | 1.0 | 1.0 | 1.0 | 1.0 | 1.0 | 1.0 |
| $La_2O_3$ | | | | | | | |
| $Y_2O_3$ | | | | | | | |
| $Sc_2O_3$ | | | | | | | |
| $CeO_2$ | | | | | | | |
| $Pr_7O_{11}$ | | | | | | | |
| $Nd_2O_3$ | 3.0 | | | | | | |
| $Sm_2O_3$ | | 3.0 | | | | | |
| $Eu_2O_3$ | | | 3.0 | | | | |
| $Gd_2O_3$ | | | | 3.0 | | | |
| $Tb_2O_3$ | | | | | 3.0 | | |
| $Dy_2O_3$ | | | | | | 3.0 | |
| $Ho_2O_3$ | | | | | | | 3.0 |
| $Er_2O_3$ | | | | | | | |
| $Tm_2O_3$ | | | | | | | |
| $Yb_2O_3$ | | | | | | | |
| $Lu_2O_3$ | | | | | | | |
| $Sb_2O_3$ | | | | | | | |
| $Bi_2O_3$ | | | | | | | |
| Total | 100 | 100 | 100 | 100 | 100 | 100 | 100 |

(* is out of the range of the invention)

TABLE 3

| | (Composition: mol %) | | | | | | |
|---|---|---|---|---|---|---|---|
| | 15 | 16 | 17 | 18 | 19 | 20 | 21 |
| $SiO_2$ | 42.0 | 42.0 | 42.0 | 42.0 | 40.0 | 40.0 | 40.0 |
| $Al_2O_3$ | 1.0 | 1.0 | 1.0 | 1.0 | 0.5 | 0.5 | 0.5 |
| $B_2O_3$ | 29.0 | 29.0 | 29.0 | 29.0 | 29.0 | 29.0 | 29.0 |
| $Na_2O$ | 3.0 | 3.0 | 3.0 | 3.0 | 4.0 | 4.0 | 4.0 |
| $K_2O$ | 3.5 | 3.5 | 3.5 | 3.5 | 3.0 | 3.0 | 3.0 |
| $Li_2O$ | | | | | 2.0 | 2.0 | 2.0 |
| BaO | 5.0 | 5.0 | 5.0 | 5.0 | 1.0 | | 0.5 |
| SrO | | | | | | 1.0 | 0.5 |
| ZnO | 10.0 | 10.0 | 10.0 | 10.0 | 13.0 | 13.0 | 13.0 |
| $MoO_3$ | 1.5 | 1.5 | 1.5 | 1.5 | 1.5 | 1.5 | 1.5 |
| FeO | 1.0 | 1.0 | 1.0 | 1.0 | 1.0 | 1.0 | 1.0 |
| $WO_3$ | | | | | | | |
| $Ni_3O_4$ | | | | | | | |
| $Co_3O_4$ | | | | | | | |
| $MnO_2$ | | | | | | | |
| $SnO_2$ | | | | | | | |
| $P_2O_5$ | | | | | | | |
| CuO | | | | | | | |
| $Cr_2O_3$ | | | | | | | |
| CaO | | | | | | | |
| $ZrO_2$ | | | | | 1.0 | 1.0 | 1.0 |
| $TiO_2$ | | | | | 0.5 | 0.5 | 0.5 |
| $HfO_2$ | | | | | | | |
| MgO | 1.0 | 1.0 | 1.0 | 1.0 | 2.0 | 2.0 | 2.0 |
| $La_2O_3$ | | | | | | | |
| $Y_2O_3$ | | | | | | | |
| $Sc_2O_3$ | | | | | | | |
| $CeO_2$ | | | | | | | |
| $Pr_7O_{11}$ | | | | | | | |

TABLE 3-continued

| (Composition: mol %) | 15 | 16 | 17 | 18 | 19 | 20 | 21 |
|---|---|---|---|---|---|---|---|
| $Nd_2O_3$ | | | | | | | |
| $Sm_2O_3$ | | | | | | | |
| $Eu_2O_3$ | | | | | | | |
| $Gd_2O_3$ | | | | | | | |
| $Tb_2O_3$ | | | | | | | |
| $Dy_2O_3$ | | | | | | | |
| $Ho_2O_3$ | | | | | | | |
| $Er_2O_3$ | 3.0 | | | | | | |
| $Tm_2O_3$ | | 3.0 | | | | | |
| $Yb_2O_3$ | | | 3.0 | | | | |
| $Lu_2O_3$ | | | | 3.0 | | | |
| $Sb_2O_3$ | | | | | | | |
| $Bi_2O_3$ | | | | | 1.5 | 1.5 | 1.5 |
| Total | 100 | 100 | 100 | 100 | 100 | 100 | 100 |

(* is out of the range of the invention)

TABLE 4

| (Composition: mol %) | 22 | 23 | 24 | 25 | 26 | 27 | 28 |
|---|---|---|---|---|---|---|---|
| $SiO_2$ | 40.0 | 40.0 | 40.0 | 40.0 | 40.0 | 40.0 | 40.0 |
| $Al_2O_3$ | 0.5 | | 0.5 | 0.5 | 0.5 | 0.5 | 0.5 |
| $B_2O_3$ | 29.0 | 29.5 | 30.0 | 30.0 | 30.0 | 30.0 | 30.0 |
| $Na_2O$ | 4.0 | 4.0 | 4.0 | 4.0 | 4.0 | 4.0 | 4.0 |
| $K_2O$ | 3.0 | 3.0 | 3.0 | 3.0 | 3.0 | 3.0 | 3.0 |
| $Li_2O$ | 2.0 | 2.0 | 2.0 | 2.0 | 2.0 | 2.0 | 2.0 |
| BaO | 0.5 | 1.0 | 1.0 | 1.0 | 1.0 | 1.0 | 1.0 |
| SrO | 0.5 | | | | | | |
| ZnO | 13.0 | 13.0 | 13.0 | 13.0 | 13.0 | 13.0 | 13.0 |
| $MoO_3$ | 1.5 | 1.5 | | | | | |
| FeO | 1.0 | 1.0 | | | | | |
| $WO_3$ | | | 1.5 | | | | |
| $Ni_3O_4$ | | | | 1.5 | | | |
| $Co_3O_4$ | | | | | 1.5 | | |
| $MnO_2$ | | | | | | 1.5 | |
| $SnO_2$ | | | | | | | |
| $P_2O_5$ | | | | | | | |
| CuO | | | | | | | |
| $Cr_2O_3$ | | | | | | | |
| CaO | | | | | | | |
| $ZrO_2$ | 1.0 | 1.0 | 1.0 | 1.0 | 1.0 | 1.0 | 1.0 |
| $TiO_2$ | | 0.5 | 0.5 | 0.5 | 0.5 | 0.5 | 0.5 |
| $HfO_2$ | 0.5 | | | | | | |
| MgO | 2.0 | 2.0 | 2.0 | 2.0 | 2.0 | 2.0 | 2.0 |
| $La_2O_3$ | | | | | | | |
| $Y_2O_3$ | | | | | | | |
| $Sc_2O_3$ | | | | | | | |
| $CeO_2$ | | | | | | | |
| $Pr_7O_{11}$ | | | | | | | |
| $Nd_2O_3$ | | | | | | | |
| $Sm_2O_3$ | | | | | | | |
| $Eu_2O_3$ | | | | | | | |
| $Gd_2O_3$ | | | | | | | |
| $Tb_2O_3$ | | | | | | | |
| $Dy_2O_3$ | | | | | | | |
| $Ho_2O_3$ | | | | | | | |
| $Er_2O_3$ | | | | | | | |
| $Tm_2O_3$ | | | | | | | |
| $Yb_2O_3$ | | | | | | | |
| $Lu_2O_3$ | | | | | | | |
| $Sb_2O_3$ | | | | | | | 1.5 |
| $Bi_2O_3$ | 1.5 | 1.5 | 1.5 | 1.5 | 1.5 | 1.5 | 1.5 |
| Total | 100 | 100 | 100 | 100 | 100 | 100 | 100 |

(* is out of the range of the invention)

TABLE 5

| (Composition: mol %) | 29 | 30 | 31 | 32 | 33* | 34* | 35* |
|---|---|---|---|---|---|---|---|
| $SiO_2$ | 40.0 | 40.0 | 40.0 | 40.0 | 40.3 | 43.0 | 27.0 |
| $Al_2O_3$ | 0.5 | 0.5 | 0.5 | 0.5 | 1.7 | 1.5 | 3.0 |
| $B_2O_3$ | 30.0 | 30.0 | 30.0 | 30.0 | 29.0 | 29.0 | 35.0 |
| $Na_2O$ | 4.0 | 4.0 | 4.0 | 4.0 | 3.0 | 3.0 | 3.0 |
| $K_2O$ | 3.0 | 3.0 | 3.0 | 3.0 | 4.0 | 4.0 | 4.0 |
| $Li_2O$ | 2.0 | 2.0 | 2.0 | 2.0 | 2.0 | 2.0 | 2.0 |
| BaO | 1.0 | 1.0 | 1.0 | 1.0 | 4.5 | 4.5 | 7.5 |
| SrO | | | | | | | |
| ZnO | 13.0 | 13.0 | 13.0 | 13.0 | 8.0 | 10.0 | 10.0 |
| $MoO_3$ | | | | | | | |
| FeO | | | | | | | |
| $WO_3$ | | | | | | | |
| $Ni_3O_4$ | | | | | | | |
| $Co_3O_4$ | | | | | | | |
| $MnO_2$ | | | | | | | |
| $SnO_2$ | 1.5 | | | | | | |
| $P_2O_5$ | | 1.5 | | | | | |
| CuO | | | 1.5 | | | | |
| $Cr_2O_3$ | | | | 1.5 | | | |
| CaO | | | | | 2.0 | 3.0 | 5.0 |
| $ZrO_2$ | 1.0 | 1.0 | 1.0 | 1.0 | | | |
| $TiO_2$ | 0.5 | 0.5 | 0.5 | 0.5 | | | |
| $HfO_2$ | | | | | | | |
| MgO | 2.0 | 2.0 | 2.0 | 2.0 | | | 3.0 |
| $La_2O_3$ | | | | | | | |
| $Y_2O_3$ | | | | | | | |
| $Sc_2O_3$ | | | | | | | |
| $CeO_2$ | | | | | | | |
| $Pr_7O_{11}$ | | | | | | | |
| $Nd_2O_3$ | | | | | | | |
| $Sm_2O_3$ | | | | | | | |
| $Eu_2O_3$ | | | | | | | |
| $Gd_2O_3$ | | | | | | | |
| $Tb_2O_3$ | | | | | | | |
| $Dy_2O_3$ | | | | | | | |
| $Ho_2O_3$ | | | | | | | |
| $Er_2O_3$ | | | | | | | |
| $Tm_2O_3$ | | | | | | | |
| $Yb_2O_3$ | | | | | | | |
| $Lu_2O_3$ | | | | | | | |
| $Sb_2O_3$ | | | | | | | |
| $Bi_2O_3$ | 1.5 | 1.5 | 1.5 | 1.5 | 5.5 | | 0.5 |
| Total | 100 | 100 | 100 | 100 | 100 | 100 | 100 |

(*is out of the range of the invention)

TABLE 6

| (Composition: mol %) | 36* | 37* | 38* | 39* | 40* | 41* | 42* |
|---|---|---|---|---|---|---|---|
| $SiO_2$ | 62.0 | 46.0 | 41.0 | 41.0 | 40.0 | 41.0 | 40.0 |
| $Al_2O_3$ | 0.5 | 1.5 | 0.5 | 0.7 | 0.5 | 1.2 | 0.5 |
| $B_2O_3$ | 21.0 | 15.0 | 41.0 | 27.0 | 21.0 | 34.0 | 22.5 |
| $Na_2O$ | 2.0 | 4.0 | 1.0 | 3.0 | 2.0 | 4.5 | 1.5 |
| $K_2O$ | 1.0 | 3.0 | 2.0 | 4.0 | 3.0 | 3.5 | 2.5 |
| $Li_2O$ | 0.5 | 2.0 | 2.0 | 2.0 | 2.0 | 2.0 | 1.0 |
| BaO | 2.5 | 5.2 | 4.5 | 17.0 | 2.5 | 3.5 | 15.0 |
| SrO | | | | | | | |
| ZnO | 8.0 | 13.0 | 7.0 | 3.0 | 27.0 | 4.0 | 16.0 |
| $MoO_3$ | | 1.5 | | | 0.5 | | |
| FeO | | | | | | | |
| $WO_3$ | | | | | | | |
| $Ni_3O_4$ | | | | | | | |
| $Co_3O_4$ | | | | | | | |
| $MnO_2$ | | | | | | | |
| $SnO_2$ | | | | | | | |
| $P_2O_5$ | | | | | | | |
| CuO | | | | | | | |
| $Cr_2O_3$ | | | | | | | |
| CaO | 1.7 | | | 1.5 | | 2.0 | |

TABLE 6-continued

| | (Composition: mol %) | | | | | | |
|---|---|---|---|---|---|---|---|
| | 36* | 37* | 38* | 39* | 40* | 41* | 42* |
| $ZrO_2$ | | 2.0 | | | | 2.0 | |
| $TiO_2$ | | 1.0 | | | 0.5 | | |
| $HfO_2$ | | | | | | | |
| MgO | | 5.0 | | | | 1.3 | |
| $La_2O_3$ | | | | 0.3 | | | |
| $Y_2O_3$ | | | | | | | |
| $Sc_2O_3$ | | | | | | | |
| $CeO_2$ | | | | | | | |
| $Pr_7O_{11}$ | | | | | | | |
| $Nd_2O_3$ | | | | | | | |
| $Sm_2O_3$ | | | | | | | |
| $Eu_2O_3$ | | | | | | | |
| $Gd_2O_3$ | | | | | | | |
| $Tb_2O_3$ | | | | | | | |
| $Dy_2O_3$ | | | | | | | |
| $Ho_2O_3$ | | | | | | | |
| $Er_2O_3$ | | | | | | | |
| $Tm_2O_3$ | | | | | | | |
| $Yb_2O_3$ | | | | | | | |
| $Lu_2O_3$ | | | | | | | |
| $Sb_2O_3$ | | | | | | | |
| $Bi_2O_3$ | 0.8 | 0.8 | 1.0 | 0.5 | 0.8 | 1.0 | 1.0 |
| Total | 100 | 100 | 100 | 100 | 100 | 100 | 100 |

(*is out of the range of the invention)

TABLE 7

| | (Composition: mol %) | | | | | | | |
|---|---|---|---|---|---|---|---|---|
| | 43* | 44* | 45* | 46* | 47* | 48 | 49 | 50 |
| $SiO_2$ | 41.0 | 41.0 | 40.0 | 40.0 | 42.0 | 43.0 | 43.0 | 43.0 |
| $Al_2O_3$ | 1.7 | 1.7 | 1.2 | 1.2 | 1.0 | 1.7 | 1.7 | 1.7 |
| $B_2O_3$ | 32.0 | 28.0 | 26.0 | 26.0 | 27.0 | 29.0 | 28.0 | 29.0 |
| $Na_2O$ | 0.5 | 4.0 | 3.5 | 3.5 | 3.0 | 1.0 | 1.0 | 2.0 |
| $K_2O$ | 0.5 | 5.5 | 2.5 | 2.5 | 2.0 | 4.5 | 4.5 | 2.5 |
| $Li_2O$ | 0.5 | 3.0 | 2.0 | 2.0 | 1.5 | 2.0 | 2.0 | 2.3 |
| BaO | 6.5 | 4.5 | 3.5 | 3.5 | 3.5 | 4.5 | 2.5 | 4.5 |
| SrO | | | | | | | 2.0 | |
| ZnO | 11.0 | 8.0 | 11.0 | 11.0 | 9.0 | 8.0 | 8.0 | 8.0 |
| $MoO_3$ | | 0.5 | | 1.0 | 2.5 | | 1.0 | |
| FeO | | | | | 3.0 | | | |
| $WO_3$ | | | | | | | | |
| $Ni_3O_4$ | | | | | | | | |
| $Co_3O_4$ | | | | | | | | |
| $MnO_2$ | | | | | | | | |
| $SnO_2$ | | | | | | | 1.0 | |
| $P_2O_5$ | | | | | | | | |
| CuO | | | | | | | | |
| $Cr_2O_3$ | | | | | | | | |
| CaO | 2.0 | | 2.0 | 2.0 | 1.5 | 4.0 | 2.0 | 4.7 |
| $ZrO_2$ | 2.5 | | 5.5 | 5.5 | | | 1.0 | |
| $TiO_2$ | | | | | | | | |

TABLE 7-continued

| | (Composition: mol %) | | | | | | | |
|---|---|---|---|---|---|---|---|---|
| | 43* | 44* | 45* | 46* | 47* | 48 | 49 | 50 |
| $HfO_2$ | | | | | | | | |
| MgO | 1.3 | 3.3 | | | 1.0 | 1.5 | 1.5 | 1.5 |
| $La_2O_3$ | | | 0.8 | 0.8 | 3.0 | | | |
| $Y_2O_3$ | | | | | | | | |
| $Sc_2O_3$ | | | | | | | | |
| $CeO_2$ | | | | | | | | |
| $Pr_7O_{11}$ | | | | | | | | |
| $Nd_2O_3$ | | | | | | | | |
| $Sm_2O_3$ | | | | | | | | |
| $Eu_2O_3$ | | | | | | | | |
| $Gd_2O_3$ | | | | | | | | |
| $Tb_2O_3$ | | | | | | | | |
| $Dy_2O_3$ | | | | | | | | |
| $Ho_2O_3$ | | | | | | | | |
| $Er_2O_3$ | | | | | | | | |
| $Tm_2O_3$ | | | | | | | | |
| $Yb_2O_3$ | | | | | | | | |
| $Lu_2O_3$ | | | | | | | | |
| $Sb_2O_3$ | | | | | | | | |
| $Bi_2O_3$ | 0.5 | 0.5 | 2.0 | 1.0 | | 0.8 | 0.8 | 0.8 |
| Total | 100 | 100 | 100 | 100 | 100 | 100 | 100 | 100 |

(*is out of the range of the invention)

With respect to the spark plugs, the insulation resistance at 500° C. was evaluated at the voltage 1000V through said process. Further, the outer appearance of the glaze layer 2*d* formed on the insulator 2 was visually observed. The film thickness of the glaze layer on the outer circumference of the base edge part of the insulator was measured in the cross section by the SEM observation. With respect to judgements on the outer appearances of the glaze layers, the outer appearances of brilliance and transparency without abnormality are excellent (○), and those with apparent abnormality are shown with kinds of abnormalities in margins. Further, for avoiding discharging at the side of the spark discharge gap g, the silicon tube was covered on the insulator 2 at the distal, while the spark plug 100 was provided to a pressing chamber, and as shown in FIG. 1, the insulator 2 is covered at the main body 2*b* with a silicone rubber-made cap RC, and a high tension lead wire insulated with a vinyl on the outer periphery is connected to the terminal metal 13. Under this condition, voltage is supplied to the spark plug 100 via the connected high tension lead wire, and at the same, the supplied voltage level is increased at rate of 0.1 to 1.5 kV/sec for measuring a limited voltage causing the flashover occasion. The results will be shown in Tables 8 to 13.

TABLE 8

| | (Composition: mol %) | | | | | | | | |
|---|---|---|---|---|---|---|---|---|---|
| | 1 | 2 | 3 | 4 | 5 | 6 | 7 | 8 | 9 |
| K/(Na + Li + K) | 0.33 | 0.45 | 0.54 | 0.54 | 0.54 | 0.54 | 0.54 | 0.54 | 0.54 |
| ZnO + BaO + SrO | 12.5 | 11.5 | 15.0 | 15.0 | 15.0 | 15.0 | 15.0 | 15.0 | 15.0 |
| $Al_2O_3$ + CaO + MgO | 5.7 | 2.2 | 2.0 | 2.0 | 2.0 | 2.0 | 2.0 | 2.0 | 2.0 |
| Thermal expansion coefficient ($\times 10^{-6}$) | 7.20 | 7.00 | 6.90 | 6.90 | 6.90 | 6.90 | 6.90 | 6.90 | 6.90 |
| Dilatometric softening point (° C.) | 570 | 580 | 560 | 560 | 560 | 560 | 560 | 560 | 560 |
| 500° C. insulating resistance | 800 MΩ | 1100 | 1000 | 1000 | 1000 | 1000 | 1000 | 1000 | 1000 |

TABLE 8-continued

| | (Composition: mol %) | | | | | | | | |
|---|---|---|---|---|---|---|---|---|---|
| | 1 | 2 | 3 | 4 | 5 | 6 | 7 | 8 | 9 |
| External appearance | ○ | ○ | ○ | ○ | ○ | ○ | ○ | ○ | ○ |
| Roughness degree of glaze layer surface (Ry: μm) | 6 | 3.0 | 6.0 | 6.0 | 6.0 | 6.0 | 6.0 | 6.0 | 6.0 |
| Anti FO voltage (kV) | 32 | 36 | 32 | 32 | 32 | 32 | 32 | 32 | 32 |
| Film thickness | 40 μm | 10 | 20 | 20 | 20 | 20 | 20 | 20 | 20 |
| Special remark | | | | | | | | | |

(* is out of the range of the invention)

TABLE 9

| | (Composition: mol %) | | | | | | | | |
|---|---|---|---|---|---|---|---|---|---|
| | 10 | 11 | 12 | 13 | 14 | 15 | 16 | 17 | 18 |
| K/(Na + Li + K) | 0.54 | 0.54 | 0.54 | 0.54 | 0.54 | 0.54 | 0.54 | 0.54 | 0.54 |
| ZnO + BaO + SrO | 15.0 | 15.0 | 15.0 | 15.0 | 15.0 | 15.0 | 15.0 | 15.0 | 15.0 |
| $Al_2O_3$ + CaO + MgO | 2.0 | 2.0 | 2.0 | 2.0 | 2.0 | 2.0 | 2.0 | 2.0 | 2.0 |
| Thermal expansion coefficient ($\times 10^{-6}$) | 6.90 | 6.90 | 6.90 | 6.90 | 6.90 | 6.90 | 6.90 | 6.90 | 6.90 |
| Dilatometric softening point (° C.) | 560 | 560 | 560 | 560 | 560 | 560 | 560 | 560 | 560 |
| 500° C. insulating resistance | 1000 | 1000 | 1000 | 1000 | 1000 | 1000 | 1000 | 1000 | 1000 |
| External appearance | ○ | ○ | ○ | ○ | ○ | ○ | ○ | ○ | ○ |
| Roughness degree of glaze layer surface (Ry: μm) | 6.0 | 6.0 | 6.0 | 6.0 | 6.0 | 6.0 | 6.0 | 6.0 | 6.0 |
| Anti FO voltage (kV) | 32 | 32 | 32 | 32 | 32 | 32 | 32 | 32 | 32 |
| Film thickness | 20 | 20 | 20 | 20 | 20 | 20 | 20 | 20 | 20 |
| Special remark | | | | | | | | | |

(* is out of the range of the invention)

TABLE 10

| | (Composition: mol %) | | | | | | | | |
|---|---|---|---|---|---|---|---|---|---|
| | 19 | 20 | 21 | 22 | 23 | 24 | 25 | 26 | 27 |
| K/(Na + Li + K) | 0.33 | 0.33 | 0.33 | 0.33 | 0.33 | 0.33 | 0.33 | 0.33 | 0.33 |
| ZnO + BaO + SrO | 14.0 | 14.0 | 14.0 | 14.0 | 14.0 | 14.0 | 14.0 | 14.0 | 14.0 |
| $Al_2O_3$ + CaO + MgO | 2.5 | 2.5 | 2.5 | 2.5 | 2.0 | 2.5 | 2.5 | 2.5 | 2.5 |
| Thermal expansion coefficient ($\times 10^{-6}$) | 6.60 | 6.50 | 6.60 | 6.60 | 6.60 | 6.60 | 6.60 | 6.60 | 6.60 |
| Dilatometric softening point (° C.) | 560 | 560 | 560 | 560 | 560 | 560 | 560 | 560 | 560 |
| 500° C. insulating resistance | 700 | 800 | 700 | 700 | 750 | 750 | 750 | 750 | 750 |
| External appearance | ○ | ○ | ○ | ○ | ○ | ○ | ○ | ○ | ○ |
| Roughness degree of glaze layer surface (Ry: μm) | 4.5 | 4.5 | 4.5 | 4.5 | 4.5 | 4.5 | 4.5 | 4.5 | 4.5 |
| Anti FO voltage (kV) | 34 | 34 | 34 | 34 | 34 | 34 | 34 | 34 | 34 |
| Film thickness | 50 | 8 | 40 | 40 | 25 | 25 | 25 | 25 | 25 |
| Special remark | | | | | | | | | |

(* is out of the range of the invention)

TABLE 11

| | (Composition: mol %) | | | | | | | | |
|---|---|---|---|---|---|---|---|---|---|
| | 28 | 29 | 30 | 31 | 32 | 33* | 34* | 35* | 36* |
| K/(Na + Li + K) | 0.33 | 0.33 | 0.33 | 0.33 | 0.33 | 0.44 | 0.44 | 0.44 | 0.29 |
| ZnO + BaO + SrO | 14.0 | 14.0 | 14.0 | 14.0 | 14.0 | 12.5 | 14.5 | 17.5 | 10.5 |

TABLE 11-continued

| (Composition: mol %) | 28 | 29 | 30 | 31 | 32 | 33* | 34* | 35* | 36* |
|---|---|---|---|---|---|---|---|---|---|
| $Al_2O_3$ + CaO + MgO | 2.5 | 2.5 | 2.5 | 2.5 | 2.5 | 3.7 | 4.5 | 11.0 | 2.2 |
| Thermal expansion coefficient (×$10^{-6}$) | 6.60 | 6.60 | 6.60 | 6.60 | 6.60 | 7.20 | 7.00 | 7.50 | 6.40 |
| Dilatometric softening point (° C.) | 560 | 560 | 560 | 560 | 560 | 530 | 600 | 530 | 630 |
| 500° C. insulating resistance | 750 | 750 | 750 | 750 | 750 | 800 | 700 | 700 | 1000 |
| External appearance | ○ | ○ | ○ | ○ | ○ | X (Brown) | Δ (A) | X (Crimping) | X (A) |
| Roughness degree of glaze layer surface (Ry: μm) | 4.5 | 4.5 | 4.5 | 4.5 | 4.5 | 2.0 | 9.0 | 13.0 | 11.0 |
| Anti FO voltage (kV) | 34 | 34 | 34 | 34 | 34 | 38 | 28 | 24 | 34 |
| Film thickness | 25 | 25 | 25 | 25 | 30 | 30 | 30 | 30 | 30 |
| Special remark | | | | | | | | | |

(*is out of the range of the invention)
A: Insufficient glaze-melting

TABLE 12

| (Composition: mol %) | 37* | 38* | 39* | 40* | 41* | 42* | 43* | 44* | 45* |
|---|---|---|---|---|---|---|---|---|---|
| K/(Na + Li + K) | 0.33 | 0.40 | 0.44 | 0.43 | 0.35 | 0.50 | 0.33 | 0.44 | 0.31 |
| ZnO + BaO + SrO | 18.2 | 11.5 | 20.0 | 29.5 | 7.5 | 31.0 | 17.5 | 12.5 | 14.5 |
| $Al_2O_3$ + CaO + MgO | 6.5 | 0.5 | 2.2 | 0.5 | 4.5 | 0.5 | 5.0 | 5.0 | 3.2 |
| Thermal expansion coefficient (×$10^{-6}$) | 7.00 | 7.20 | 8.60 | 6.20 | 7.00 | 7.30 | 6.80 | 8.50 | 7.00 |
| Dilatometric softening point (° C.) | 615 | 545 | 555 | 540 | 615 | 555 | 640 | 520 | 565 |
| 500° C. insulating resistance | 900 | 500 | 700 | 300 | 1200 | 350 | 1500 | 150 | 900 |
| External appearance | X (A) | X (Crimping) | X (Crazing) | X (B) | Δ (A) | X (B) | X (A) | ○ | Δ (A) |
| Roughness degree of glaze layer surface (Ry: μm) | 10.0 | 9.5 | 7.0 | 6.5 | 8.5 | 8.0 | 7.0 | 3.0 | 7.0 |
| Anti FO voltage (kV) | 36 | 26 | 28 | 22 | 30 | 24 | 34 | 20 | 32 |
| Film thickness | 30 | 60 | 30 | 30 | 30 | 30 | 30 | 30 | 30 |
| Special remark | | Water proof: Bad | Thermal expansion: Large | | | | | | |

(*is out of the range of the invention)
A: Insufficient glaze-melting
B: Devitirification

TABLE 13

| (Composition: mol %) | 46* | 47* | 48 | 49 | 50 |
|---|---|---|---|---|---|
| K/(Na + Li + K) | 0.31 | 0.31 | 0.60 | 0.60 | 0.37 |
| ZnO + BaO + SrO | 14.5 | 12.5 | 12.5 | 12.5 | 12.5 |
| $Al_2O_3$ + CaO + MgO | 3.2 | 3.5 | 7.2 | 5.2 | 7.9 |
| Thermal expansion coefficient (×$10^{-6}$) | 7.00 | 7.10 | 7.00 | 6.90 | 6.85 |
| Dilatometric softening point (° C.) | 570 | 610 | 580 | 580 | 590 |
| 500° C. insulating resistance | 900 | 850 | 1300 | 1300 | 1000 |
| External appearance | Δ (Insufficient glaze-melting) | Δ (Insufficient glaze-melting) (Coloring) | ○ | ○ | ○ |

TABLE 13-continued

| | (Composition: mol %) | | | | |
|---|---|---|---|---|---|
| | 46* | 47* | 48 | 49 | 50 |
| Roughness degree of glaze layer surface (Ry: $\mu$m) | 7.0 | 7.0 | 3.0 | 3.0 | 5.5 |
| Anti FO voltage (kV) | 32 | 32 | 38 | 38 | 34 |
| Film thickness | 30 | 30 | 30 | 30 | 30 |
| Special remark | | | | | |

(*is out of the range of the invention)

According to the results, depending on the compositions of the glaze of the invention, although no Pb is substantially contained, the glaze may be baked at relatively low temperatures, sufficient insulating properties are secured, and the outer appearance of the baked glaze faces are almost satisfied.

This application is based on Japanese Patent application JP 2001-192611, filed Jun. 26, 2001, the entire content of which is hereby incorporated by reference, the same as if set forth at length.

What is claimed is:

1. A spark plug comprising:

a center electrode;

a metal shell; and an alumina ceramic insulator disposed between the center electrode and the metal shell, wherein at least part of the surface of the insulator is covered with a glaze layer comprising oxides, the glaze layer comprising:

1 mol % or less of Pb component in terms of PbO;

40 to 60 mol % of a Si component in terms of $SiO_2$;

20 to 40 mol % of a B component in terms of $B_2O_3$;

0.5 to 25 mol % of a Zn component in terms of ZnO;

0.5 go 15 mol % in total of at least one of Ba and Sr components in terms of BaO and SrO, respectively;

2 to 12 mol % in total of at least one alkaline metal component of Na, K and Li, in terms of $Na_2O$, $K_2O$, and $Li_2O$, respectively, wherein K is essential; and 0.1 to 5 mol % in total of at least one component of Bi, Sb and rare earth RE, RE being at least one selected from Sc, Y, La, Ce, Pr, Nd, Sm, Eu, Gd, Th, Dy, Ho, Er, Tm, Yb and Lu, in terms of $Bi_2O_3$, $Sb_2O_5$ and $RE_2O_3$, respectively, proviso that Ce is in terms of $CeO_2$, and Pr is in terms of $Pr_7O_{11}$, wherein the glaze layer comprises 8 to 30 mol % in total of the Zn component and the at least one of Ba and Sr components in terms of ZnO, BaO and SrO, respectively, and has a surface roughness so that a maximum height (Ry) is 7 $\mu$m or less as measured by JIS:B0601.

2. The spark plug according to claim 1, wherein the glaze layer comprises: 10 to 20 mol % of a Zn component in terms of ZnO; and 0.1 to 2.5 mol % in total of at least one component of Bi, Sb and rare earth RE, RE being at least one selected from Sc, Y, La, Ce, Pr, Nd, Sm, Eu, Gd, Th, Dy, Ho, Er, Tm, Yb and Lu, in terms of $Bi_2O_3$, $Sb_2O_5$ and $RE_2O_3$, respectively, proviso that Ce is in terms of $CeO_2$ and Pr is in terms of $Pr_7O_{11}$.

3. The spark plug according to claim 1, wherein the glaze layer comprises: $Nna_2O$ mol % of a Na component in terms of $Na_2O$; $NK_2O$ mol % of a K component in terms of $K_2$0; and $NLi_2O$ mol % of a Li component in terms of $Li_2O$, and the glaze layer satisfies a relationship: $Nna_2O \leqq NLi_2O \leqq NK_2O$.

4. The spark plug according to claim 1, wherein the glaze layer comprises the K component and at least two alkaline metal components among the Li, Na and K components, and satisfies the relationship: $0.4 \leqq NK_2O/NR_2O \leqq 0.8$ when the at least two alkaline metals are taken as R, $NR_2O$ is a total mol % content of the at least two alkaline metal components in terms of a composition formula $R_2O$, and $NK_2O$ is a mol content of the K component in terms of $K_2O$.

5. The spark plug according to claim 1, wherein the glaze later further comprises 0.5 to 5 mol % in total of at least one of Mo, W, Ni, Co, Fe and Mn components in terms of $MoO_3$, $WO_3$, $Ni_3O_4$, $Co_3O_4$, $Fe_2O_3$, and $MnO_2$, respectively.

6. The spark plug according to claim 1, wherein the glaze layer further comprises 0.5 to 5 mol % in total of at least one of Zr, Ti and Hf components in terms of ZrO2, $TiO_2$ and $HfO_2$, respectively.

7. The spark plug according to claim 1, wherein the glaze layer further comprises 0.1 to 15 mol % in total of at least one of 0.1 to 10 mol % of an Al component in terms of $Al_2O_3$, 0.1 to 10 mol % to 10 mol % of an Al component in terms of CaO, and 0.1 to 10 mol % of Mg component in terms of MgO.

8. The spark plug according to claim 1, wherein the glaze layer further comprises 5 mol % or less in total of at least one of Sn, P, Cu and Cr components in terms of $SnO_2$, $P_2O_5$, CuO and $Cr_2O_3$, respectively.

9. The spark plug according to claim 1, wherein the insulator is formed with a projection part in an outer circumferential direction at an axially central position thereof, taking, as a front side, a side directing toward the front end of the center electrode in the axial direction, a cylindrical face is shaped in the outer circumferential face at a base portion of the insulator main body in the neighborhood of a rear side opposite the projection part, and the outer circumferential face at the base portion is covered with the glaze layer formed with a film thickness ranging 7 to 50 $\mu$m.

10. The spark plug according to claim 1, which comprises one of: a terminal metal fixture and the center electrode as one body, in a through hole of the insulator; and a terminal metal fixture provided separately from the center electrode via a conductive bonding layer; and an insulation resistant value is 400 MΩ or more, which is measured by keeping the whole of the spark plug at about 500° C. and passing a current between the terminal metal fixture and the metal shell via the insulator.

11. The spark plug according to claim 1, wherein the insulator comprises an alumina insulating material comprising 85 to 98 mol % of an Al component in terms of $Al_2O_3$, and the glaze layer has an average thermal expansion coefficient at a temperature ranging 20 to 350° C. of $5\times10^{-6}$/° C. to $8.5\times10^{-6}$/° C.

12. The spark plug according to claim 1, wherein the glaze layer has a dilatometric softening point of 520 to 620° C.

13. A spark plug comprising:

a center electrode;

a metal shell; and an alumina ceramic insulator disposed between the center electrode and the metal shell, wherein at least part of the surface of the insulator is covered with a glaze layer comprising oxides, the glaze layer comprising:

1 mol % or less of Pb component in terms of PbO;

40 to 60 mol % of a Si component in terms of $SiO_2$;

20 to 40 mol % of a B component in terms of $B_2O_3$;

0.5 to 25 mol % of a Zn component in terms of ZnO;

0.5 go 15 mol % in total of at least one of Ba and Sr components in terms of BaO and SrO, respectively;

2 to 12 mol % in total of at least one alkaline metal component of Na, K and Li, in terms of $Na_2O$, $K_2O$, and $Li_2O$, respectively, wherein K is essential; and 0.1 to 5 mol % in total of at least one component of Bi, Sb and rare earth RE, RE being at least one selected from Sc, Y, La, Ce, Pr, Nd, Sm, Eu, Gd, Tb, Dy, Ho, Er, Tm, Yb and Lu, in terms of $Bi_2O_3$, $Sb_2O_3$ and $RE_2O_3$, respectively, proviso that Ce is in terms of $CeO_2$, and Pr is in terms of $Pr_7O_{11}$, wherein the glaze layer comprises 8 to 30 mol % in total of the Zn component and the at least one of Ba and Sr components in terms of ZnO, BaO and SrO, respectively, wherein the insulator is formed with a projection part in an outer circumferential direction at an axially central position thereof, taking, as a front side, a side directing toward the front end of the center electrode in the axial direction, a cylindrical face is shaped in the outer circumferential face at a base portion of the insulator main body in the neighborhood of a rear side opposite the projection part, and the outer circumferential face at the base portion is covered with the glaze layer, the glaze layer having a surface roughness wherein a maximum height ($R_\gamma$) of which is 7 μm or less in accordance to the measurement prescribed by JIS:B0601.

14. A spark plug comprising:

a center electrode;

a metal shell; and an alumina ceramic insulator disposed between the center electrode and the metal shell, wherein at least part of the surface of the insulator is covered with a glaze layer comprising oxides, the glaze layer comprising:

1 mol % or less of Pb component in terms of PbO;

40 to 60 mol % of a Si component in terms of $SiO_2$;

20 to 40 mol % of a B component in terms of $B_2O_3$;

0.5 to 25 mol % of a Zn component in terms of ZnO;

0.5 go 15 mol % in total of at least one of Ba and Sr components in terms of BaO and SrO, respectively;

2 to 12 mol % in total of at least one alkaline metal component of Na, K and Li, in terms of $Na_2O$, $K_2O$, and $Li_2O$, respectively, wherein K is essential; and 0.1 to 5 mol % in total of at least one component of Sb and rare earth RE, RE being at least one selected from Sc, Y, La, Ce, Pr, Nd, Sm, Eu, Gd, Tb, Dy, Ho, Er, Tm, Yb and Lu, in terms of $Sb_2O_5$ and $RE_2O_3$, respectively, proviso that Ce is in terms of $CeO_2$, and Pr is in terms of $Pr_7O_{11}$, wherein the glaze layer comprises 8 to 30 mol % in total of the Zn component and the at least one of Ba and Sr components in terms of ZnO, BaO and SrO, respectively, and has a surface roughness so that a maximum height ($R_\gamma$) is 7 μm or less as measured by JIS:B0601.

15. A spark plug comprising:

a center electrode;

a metal shell; and an alumina ceramic insulator disposed between the center electrode and the metal shell, wherein at least part of the surface of the insulator is covered with a glaze layer comprising oxides, the glaze layer comprising:

1 mol % or less of Pb component in terms of PbO;

40 to 60 mol % of a Si component in terms of $SiO_2$;

20 to 40 mol % of a B component in terms of $B_2O_3$;

0.5 to 25 mol % of a Zn component in terms of ZnO;

0.5 to 15 mol % in total of at least one of Ba and Sr components, in which total amount of the Ba and Sr components is 0.5 to 15 mol % in terms of BaO and SrO, respectively;

2 to 12 mol % in total of at least one alkaline metal component of Na, K and Li, in terms of $Na_2O$, $K_2O$, and $Li_2O$, respectively, wherein K is essential; and 0.1 to 5 mol % in total of at least one component of Bi, Sb and rare earth RE, RE being at least one selected from Sc, Y, La, Ce, Pr, Nd, Sm, Eu, Gd, Tb, Dy, Ho, Er, Tm, Yb and Lu, in terms of $Bi_2O_3$, $Sb_2O_5$ and $RE_2O_3$, respectively, proviso that Ce is in terms of $CeO_2$, and Pr is in terms of $Pr_7O_{11}$, wherein the glaze layer comprises 8 to 30 mol % in total of the Zn, Ba and Sr components, in terms of ZnO, BaO and SrO, respectively, and has a surface roughness so that a maximum height ($R_\gamma$) is 7 μm or less as measured by JIS:B0601.

* * * * *